US009269368B2

(12) United States Patent
Chen et al.

(10) Patent No.: US 9,269,368 B2
(45) Date of Patent: Feb. 23, 2016

(54) SPEAKER-IDENTIFICATION-ASSISTED UPLINK SPEECH PROCESSING SYSTEMS AND METHODS

(71) Applicant: Broadcom Corporation

(72) Inventors: Juin-Hwey Chen, Irvine, CA (US); Jes Thyssen, San Juan Capistrano, CA (US); Elias Nemer, Irvine, CA (US); Bengt J. Borgstrom, Santa Monica, CA (US); Ashutosh Pandey, Irvine, CA (US); Robert W. Zopf, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 279 days.

(21) Appl. No.: 14/069,124

(22) Filed: Oct. 31, 2013

(65) Prior Publication Data

US 2014/0278397 A1 Sep. 18, 2014

Related U.S. Application Data

(60) Provisional application No. 61/880,349, filed on Sep. 20, 2013, provisional application No. 61/788,135, filed on Mar. 15, 2013.

(51) Int. Cl.
*G10L 21/00* (2013.01)
*G10L 15/00* (2013.01)
*G10L 25/00* (2013.01)
*G10L 21/02* (2013.01)

(52) U.S. Cl.
CPC .................................... *G10L 21/02* (2013.01)

(58) Field of Classification Search
USPC ............... 704/226, 235, 246, 270, 270.1, 275
See application file for complete search history.

(56) References Cited

U.S. PATENT DOCUMENTS

| | | | | |
|---|---|---|---|---|
| 5,897,616 | A * | 4/1999 | Kanevsky | G10L 17/24 379/88.02 |
| 6,937,980 | B2 * | 8/2005 | Krasny | G10L 15/20 704/231 |
| 7,046,794 | B2 * | 5/2006 | Piket et al. | 379/406.04 |
| 7,133,825 | B2 * | 11/2006 | Bou-Ghazale | G10L 21/0208 704/226 |
| 7,236,929 | B2 * | 6/2007 | Hodges | G10L 25/78 215/226 |
| 7,443,978 | B2 * | 10/2008 | Isaka | G10L 19/18 379/406.03 |
| 8,374,851 | B2 * | 2/2013 | Unno et al. | 704/208 |
| 8,554,557 | B2 * | 10/2013 | Hetherington | 704/233 |
| 2004/0076226 | A1 * | 4/2004 | LeBlanc | G10L 19/0208 375/222 |
| 2005/0129225 | A1 * | 6/2005 | Piket | H04M 9/082 379/406.1 |
| 2008/0189116 | A1 * | 8/2008 | LeBlanc | H04M 9/082 704/500 |
| 2009/0036170 | A1 * | 2/2009 | Unno | H04M 9/082 455/570 |
| 2011/0300806 | A1 * | 12/2011 | Lindahl | G10L 21/0208 455/63.1 |
| 2012/0158404 | A1 * | 6/2012 | Shin | G10L 21/0216 704/233 |
| 2013/0073285 | A1 * | 3/2013 | Hetherington | 704/233 |

* cited by examiner

*Primary Examiner* — Edgar Guerra-Erazo
(74) *Attorney, Agent, or Firm* — Fiala & Weaver P.L.L.C.

(57) ABSTRACT

Methods, systems, and apparatuses are described for performing speaker-identification-assisted speech processing in an uplink path of a communication device. In accordance with certain embodiments, a communication device includes speaker identification (SID) logic that is configured to identify the identity of a near-end speaker. Knowledge of the identity of the near-end speaker is then used to improve the performance of one or more uplink speech processing algorithms implemented on the communication device.

20 Claims, 20 Drawing Sheets

SPEAKER-IDENTIFICATION-ASSISTED UPLINK SPEECH PROCESSING SYSTEMS AND METHODS

CROSS REFERENCE TO RELATED APPLICATION

This application claims priority to U.S. Provisional Application Ser. No. 61/788,135, filed Mar. 15, 2013, and U.S. Provisional Application Ser. No. 61/880,349, filed Sep. 20, 2013, which are incorporated by reference herein in its entirety.

BACKGROUND

1. Technical Field

The subject matter described herein relates to speech processing algorithms that are used in digital communication systems, such as cellular communication systems, and in particular to speech processing algorithms that are used in the uplink paths of communication devices, such as the uplink paths of cellular telephones.

2. Description of Related Art

A number of different speech processing algorithms are currently used in cellular communication systems. For example, the uplink paths of conventional cellular telephones may implement speech processing algorithms such as acoustic echo cancellation, multi-microphone noise reduction, single-channel noise suppression, residual echo suppression, single-channel dereverberation, wind noise reduction, automatic speech recognition, speech encoding, and the like. Generally speaking, these algorithms typically all operate in a speaker-independent manner. That is to say, each of these algorithms is typically designed to perform in the same manner regardless of the identity of the speaker that is currently using the cellular telephone.

BRIEF SUMMARY

Methods, systems, and apparatuses are described for performing speaker-identification-assisted speech processing in the uplink path of a communication device, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
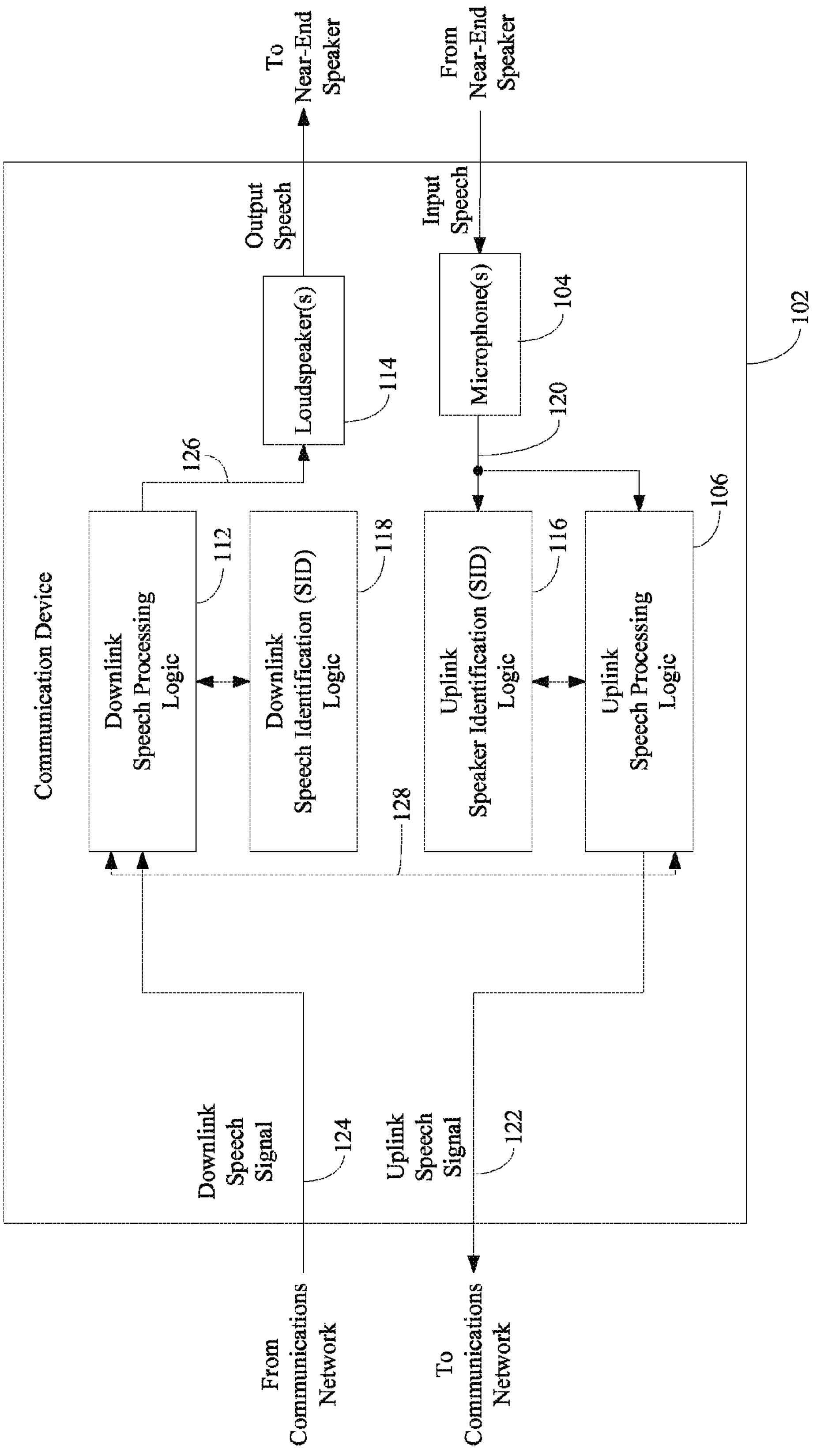
FIG. 1 is a block diagram of a communication device that implements speaker-identification-assisted speech processing techniques in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Many of the techniques described herein are described in connection with speech signals. The term "speech signal" is used herein to refer to any audio signal that includes at least some speech but does not necessarily mean an audio signal that includes only speech. In this regard, examples of speech signals may include an audio signal captured by one or more microphones of a communication device during a communication session and an audio signal played back via one or more loudspeakers of the communication device during a communication session. As will be appreciated by persons skilled in the relevant art(s), such audio signals may include both speech and non-speech portions.

Almost all of the various speech processing algorithms used in communication systems today have the potential to perform significantly better if the algorithms could determine with a high degree of confidence at any given time whether the input speech signal is the speech signal uttered by a target speaker. Therefore, embodiments described herein use an automatic speaker identification (SID) algorithm to determine whether the input speech signal at any given time is uttered by a specific target speaker and then adapt various speech processing algorithms accordingly to take the maximum advantage of this information. By using this technique, the entire communication system can potentially achieve significantly better performance. For example, speech processing algorithms in the uplink path of a communication device have the potential to perform significantly better if they know at any given time whether a current frame (or a current frequency band in a current frame) of a speech signal is predominantly the voice of a target speaker.

In particular, a method is described herein. In accordance with the method, speaker identification information that identifies a target speaker is received by one or more speech signal processing stages in an uplink path of a communication device. A respective version of a speech signal is processed by each of the one or more speech signal processing stages in a manner that takes into account the identity of the target speaker. The one or more speech signal processing stages include at least one of an acoustic echo cancellation stage, a multi-microphone noise reduction stage, a single-channel noise suppression stage, a residual echo suppression stage, a single-channel dereverberation stage, a wind noise reduction stage, an automatic speech recognition stage, and a speech encoding stage.

A communication device is also described herein. The communication device includes uplink speech processing logic that includes one or more speech signal processing stages. Each of the one or more speech signal processing stages is configured to receive speaker identification information that identifies a target speaker and process a respective version of the speech signal in a manner that takes into account the identity of the target speaker. The one or more speech signal processing stages include at least one of an acoustic echo cancellation stage, a multi-microphone noise reduction stage, a single-channel noise suppression stage, a residual echo suppression stage, a single-channel dereverberation stage, a wind noise reduction stage, an automatic speech recognition stage, and a speech encoding stage.

A computer readable storage medium having computer program instructions embodied in said computer readable storage medium for enabling a processor to process a speech signal is further described herein. The computer program instructions include instructions that are executable to perform operations. In accordance with the operations, speaker identification information that identifies a target speaker is received by one or more speech signal processing stages in an uplink path of a communication device. A respective version of a speech signal is processed by each of the one or more speech signal processing stages in a manner that takes into account the identity of the target speaker. The one or more speech signal processing stages include at least one of an acoustic echo cancellation stage, a multi-microphone noise reduction stage, a single-channel noise suppression stage, a residual echo suppression stage, a single-channel dereverberation stage, a wind noise reduction stage, an automatic speech recognition stage, and a speech encoding stage.

II. Example Systems and Methods for Performing Speaker-Identification-Based Speech Processing in an Uplink Path of a Communication Device FIG. 1 is a block diagram of a communication device 102 that is configured to perform speaker-identification-based speech processing during a communication session in accordance with an embodiment. As shown in FIG. 1, communication device 102 includes one or more microphones 104, uplink speech processing logic 106, downlink speech processing logic 112, one or more loudspeakers 114, uplink speaker identification (SID) logic 116 and downlink SID logic 118. Examples of communication device 102 may include, but are not limited to, a cellular telephone, a personal data assistant (PDA), a tablet computer, a laptop computer, a handheld computer, a desktop computer, a video game system, or any other device capable of conducting a video call and/or an audio-only telephone call.

Microphone(s) 104 may be configured to capture input speech originating from a near-end speaker and to generate an input speech signal 120 based thereon. Uplink speech processing logic 106 may be configured to process input speech signal 120 in accordance with various uplink speech processing algorithms to produce an uplink speech signal 122. Examples of uplink speech processing algorithms include, but are not limited to, acoustic echo cancellation, residual echo suppression, single channel or multi-microphone noise suppression, wind noise reduction, automatic speech recognition, single channel dereverberation, speech encoding, etc. Uplink speech signal 122 may be processed by one or more components that are configured to encode and/or convert uplink speech signal 122 into a form that is suitable for wired and/or wireless transmission across a communication network. Uplink speech signal 122 may be received by devices or systems associated with far-end speaker(s) via the communication network. Examples of communication networks include, but are not limited to, networks based on Code Division Multiple Access (CDMA), Time Division Multiple Access (TDMA), Frequency Division Multiple Access (TDMA), Frequency Division Duplex (FDD), Global System for Mobile Communications (GSM), Wideband-CDMA (W-CDMA), Time Division Synchronous CDMA (TD-SCDMA), Long-Term Evolution (LTE), Time-Division Duplex LTE (TDD-LTE) system, and/or the like.

Communication device 102 may also be configured to receive a speech signal (e.g., downlink speech signal 124) from the communication network. Downlink speech signal 124 may originate from devices or systems associated with far-end speaker(s). Downlink speech signal 124 may be processed by one or more components that are configured to convert and/or decode downlink speech signal 124 into a form that is suitable for processing by communication device 102. Downlink speech processing logic 112 may be configured to process downlink speech signal 124 in accordance with various downlink speech processing algorithms to produce an output speech signal 126. Examples of downlink speech processing algorithms include, but are not limited to, joint source channel decoding, speech decoding, bit error concealment, packet loss concealment, speech intelligibility enhancement, acoustic shock protection, 3D audio production, etc. Loudspeaker(s) 114 may be configured to play back output speech signal 126 so that it may be perceived by one or more near-end users.

In an embodiment, the various uplink and downlink speech processing algorithms may be performed in a manner that takes into account the identity of one or more near-end speakers and/or one or more far-end speakers participating in a communication session via communication device 102. This is in contrast to conventional systems, where speech processing algorithms are performed in a speaker-independent manner.

In particular, uplink SID logic 116 may be configured to receive input speech signal 120 and perform SID operations based thereon to identify a near-end speaker associated with input speech signal 120. For example, uplink SID logic 116 may obtain a speaker model for the near-end speaker. In one embodiment, uplink SID logic 116 obtains a speaker model from a storage component of communication device 102 or from an entity on a communication network to which communication device 102 is communicatively connected. In another embodiment, uplink SID logic 116 obtains the speaker model by analyzing one or more portions (e.g., one or more frames) of input speech signal 120. Once the speaker model is obtained, other portion(s) of input speech signal 120 (e.g., frame(s) received subsequent to obtaining the speaker model) are compared to the speaker model to generate a measure of confidence, which is indicative of the likelihood that the other portion(s) of input speech signal 120 are associated with the near-end speaker. Upon the measure of confidence exceeding a predefined threshold, an SID-assisted mode may be enabled for communication device 102 that causes the various uplink speech processing algorithms to operate in a manner that takes into account the identity of the near-end speaker. Such uplink speech processing algorithms are described below in Section III.

Likewise, downlink SID logic 118 may be configured to receive a decoded version of downlink speech signal 124 from downlink speech processing logic 112 and perform SID operations based thereon to identify a far-end speaker associated with downlink speech signal 124. For example, downlink SID logic 118 may obtain a speaker model for the far-end speaker. In one embodiment, downlink SID logic 118 obtains a speaker model from a storage component of communication device 102 or from an entity on a communication network to which communication device 102 is communicatively coupled. In another embodiment, downlink SID logic 118 obtains the speaker model by analyzing one or more portions (e.g., one or more frames) of a decoded version of downlink speech signal 124. Once the speaker model is obtained, other portion(s) of the decoded version of downlink speech signal 124 (e.g., frame(s) received subsequent to obtaining the speaker model) are compared to the speaker model to generate a measure of confidence, which is indicative of the likelihood that the other portion(s) of the decoded version of downlink speech signal 124 are associated with the far-end speaker. Upon the measure of confidence exceeding a predefined threshold, an SID-assisted mode may be enabled for communication device 102 that causes the various downlink speech processing algorithms to operate in a manner that takes into account the identity of the far-end speaker.

In an embodiment, a speaker may also be identified using biometric and/or facial recognition techniques performed by logic (not shown in FIG. 1) included in communication device 102 instead of by obtaining a speaker model in the manner previously described.

Each of the speech processing algorithms performed by communication device 102 can benefit from the use of the SID-assisted mode. Multiple speech processing algorithms can be controlled or assisted by the same SID logic to achieve maximum efficiency in computational complexity. Uplink SID logic 116 may control or assist all speech processing algorithms performed by uplink speech processing logic 106 for the uplink signal (i.e., input speech signal 120), and downlink SID logic 118 may control or assist all speech processing algorithms performed by downlink speech processing logic 112 for the downlink signal (i.e., downlink speech signal 124). In the case of a speech processing algorithm that takes both the downlink signal and the uplink signal as inputs (such as an algorithm performed by an acoustic echo canceller (AEC)), both downlink SID logic 118 and uplink SID logic 116 can be used together to control or assist such a speech processing algorithm.

It is possible that information obtained by downlink speech processing logic 112 may be useful for performing uplink speech processing and, conversely, that information obtained by uplink speech processing logic 106 may be useful for performing downlink speech processing. Accordingly, in accordance with certain embodiments, such information may be shared between downlink speech processing logic 112 and uplink speech processing logic 106 to improve speech processing by both. This option is indicated by dashed line 128 coupling downlink speech processing logic 112 and uplink speech processing logic 106 in FIG. 1.

In certain embodiments, communication device 102 may be trained to be able to identify a single near-end speaker (e.g., the owner of communication device 102, as the owner will be the user of communication device 102 roughly 95 to 99% of the time). While doing so may result in improvements in speech processing the majority of the time, such an embodiment does not take into account the occasional use of communication device 102 by other users. For example, occasionally a family member or a friend of the primary user of communication device 102 may also use communication device 102. Moreover, such an embodiment does not take into account downlink speech signal 124 received by communication device 102 via the communication network, which keeps changing from communication session to communication session. Furthermore, the near-end speaker and/or the far-end speaker may even change during the same communication session in either the uplink or the downlink direction, as two or more people might use a respective communication device in a conference/speakerphone mode.

Accordingly, uplink SID logic 116 and downlink SID logic 118 may be configured to determine when another user begins speaking during the communication session and operate the various speech processing algorithms in a manner that takes into account the identity of the other user.

Figure 2:
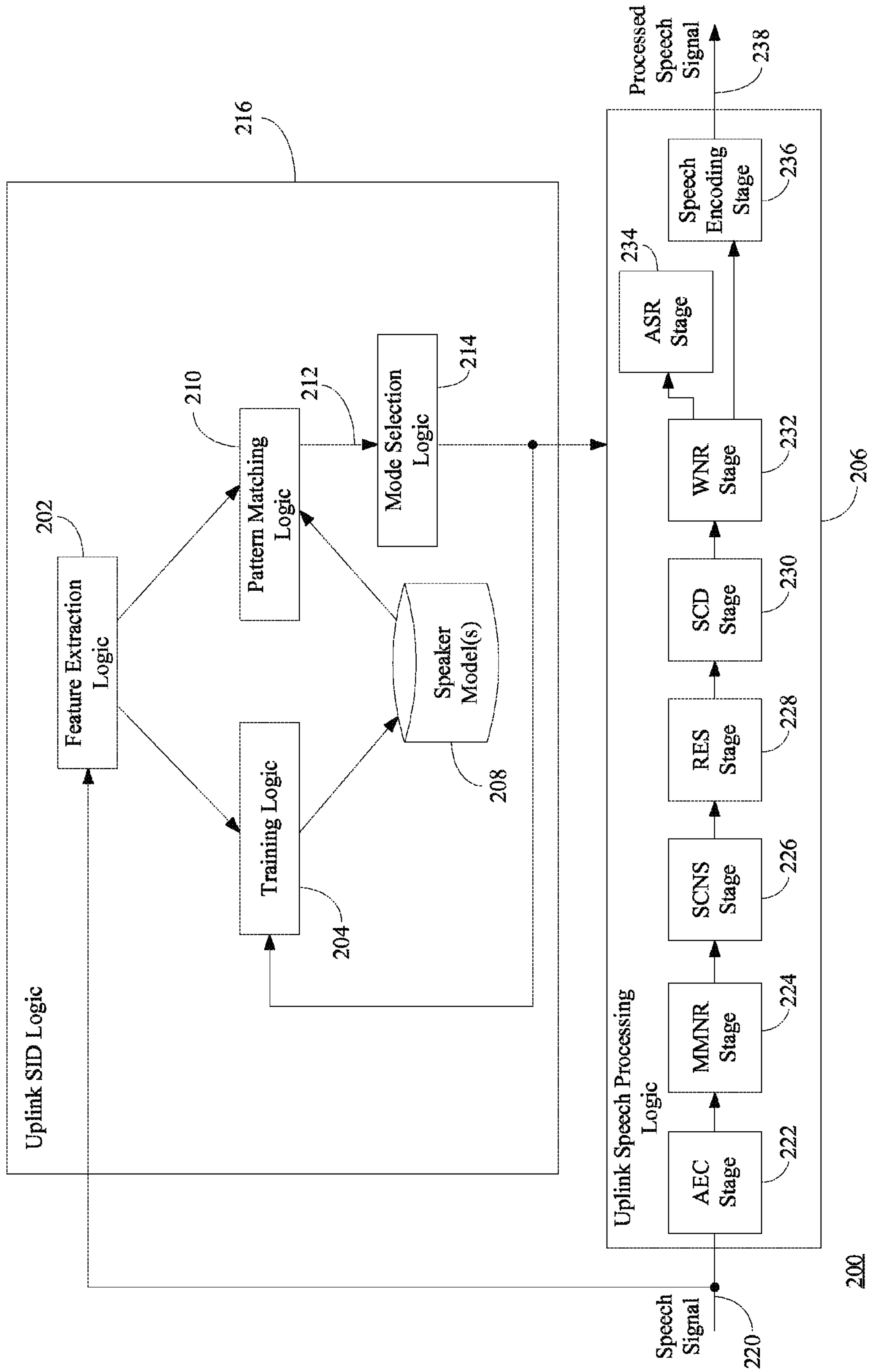
FIG. 2 is a block diagram of uplink speaker identification logic and uplink speech processing logic of a communication device in accordance with an embodiment.

FIG. 2 is a block diagram 200 of example uplink SID logic 216 and uplink speech processing logic 206 in accordance with an embodiment. Uplink SID logic 216 may comprise an implementation of uplink SID logic 116 as described above in reference to FIG. 1. In further accordance with such an embodiment, speech signal 220 may correspond to input speech signal 120 and uplink speech processing logic 206 may correspond to uplink speech processing logic 106. As discussed above in reference to FIG. 1, uplink SID logic 216 is configured to determine the identity of near-end speaker(s) speaking during a communication session.

Uplink speech processing logic 206 may be configured to process speech signal 220 in accordance with various uplink speech processing algorithms to produce a processed speech signal 238. Processed speech signal 238 may be received by devices or systems associated with far-end speaker(s) via the communication network. The various uplink speech processing algorithms may be performed in a manner that takes into account the identity of one or more near-end speakers using communication device 102. The uplink speech processing algorithms may be performed by a plurality of respective stages of uplink speech processing logic 206. Such stages include, but are not limited to, an acoustic echo cancellation (AEC) stage 222, a multi-microphone noise reduction (MMNR) stage 224, a single-channel noise suppression (SCNS) stage 226, a residual echo suppression (RES) stage 228, a single-channel dereverberation (SCD) stage 230, a wind noise reduction (WNR) stage 232, an automatic speech recognition (ASR) stage 234, and a speech encoding stage 236. In some example embodiments, one or more of the stages shown in FIG. 2 may not be included. Moreover, stages in addition to or in lieu of the stages shown in FIG. 2 may be included. Furthermore, in some example embodiments, one or more of the stages shown in FIG. 2 may be arranged in an alternate order, or executed partially, substantially, or completely concurrently with other stages. Each of these stages is discussed in greater detail below in reference to FIGS. 3-18.

As shown in FIG. 2, uplink SID logic 216 includes feature extraction logic 202, training logic 204, one or more speaker models 208, pattern matching logic 210 and mode selection logic 214. Feature extraction logic 202 may be configured to continuously collect and analyze speech signal 220 to extract feature(s) therefrom during a communication session with another user. That is, feature extraction is done on an ongoing basis during a communication session rather than during a "training mode," in which a user speaks into communication device 102 outside of an actual communication session with another user. It is noted that feature extraction logic 202 may be configured to collect and analyze other representations of speech signal 220, such as processed versions of such speech signal output by AEC stage 222, MMNR stage 224, SCNS stage 226, RES stage 228, SCD stage 230, WNR stage 232, ASR stage 234, or speech encoding stage 236.

One advantage of continuously collecting and analyzing speech signal 220 is that the SID operations are invisible and transparent to the user (i.e., a "blind training" process is performed on speech signal(s) received by communication device 102). Thus, user(s) are unaware that any SID operation is being performed, and the user of communication device 102 can receive the benefit of the SID operations automatically without having to explicitly "train" communication device 102 during a "training mode." Moreover, such a "training mode" is only useful for training near-end users, not far-end users, as it would be awkward to have to ask a far-end caller to train communication device 102 before starting a normal conversation in a phone call.

In an embodiment, feature extraction logic 202 extracts feature(s) from one or more portions (e.g., one or more frames) of speech signal 220, and maps each portion to a multidimensional feature space, thereby generating a feature vector for each portion. For speaker identification, features that exhibit high speaker discrimination power, high interspeaker variability, and low intraspeaker variability are desired. Examples of various features that feature extraction logic 202 may extract from speech signal 220 are described in Campbell, Jr., J., "Speaker Recognition: A Tutorial," Proceedings of the IEEE, Vol. 85, No. 9, September 1997, the entirety of which is incorporated by referenced herein. Such features may include, for example, reflection coefficients (RCs), log-area ratios (LARs), arcsin of RCs, line spectrum pair (LSP) frequencies, and the linear prediction (LP) cepstrum.

In an embodiment, uplink SID logic 216 may employ a voice activity detector (VAD) to distinguish between a speech signal and a non-speech signal. In accordance with this embodiment, feature extraction logic 202 only uses the active portion of the speech for feature extraction.

Training logic 204 may be configured to receive feature(s) extracted from one or more portions (e.g., one or more frames) of speech signal 220 by feature extraction logic 202 and process such feature(s) to generate a speaker model 208 for a desired speaker (i.e., a near-end speaker that is speaking). In an embodiment, speaker model 208 is represented as a Gaussian Mixture Model (GMM) that is derived from a universal background model (UBM) stored in communication device 102. That is, the UBM serves as a basis for generating a GMM speaker model for the desired speaker. The GMM speaker model may be generated based on a maximum a posteriori (MAP) method, where a soft class label is generated for each portion (e.g., frame) of input signal received. A soft class label is a value representative of a probability that the portion being analyzed is from the target speaker.

When generating a GMM speaker model, speaker-dependent signatures (i.e., feature(s) extracted by feature extraction logic 202) and/or spatial information (e.g., in an embodiment where a plurality of microphones are used) are obtained to predict the presence of a desired source (e.g., a desired speaker) and interfering sources (e.g., noise) in the portion of the speech signal being analyzed. Each portion may be scored against a model of the current acoustic scene using acoustic scene analysis (ASA) to obtain the soft class label. If the soft class labels show the current portion to be a desired source with high likelihood, then the portion can be used to train the desired GMM speaker model. Otherwise, the portion is not used to train the desired GMM speaker model. In addition to the GMM speaker model, the UBM can also be updated using this information to further assist in GMM speaker model generation. In this case, the UBM can be updated with speech portions that are highly likely to be interfering sources so that the UBM provides a more accurate model for the null hypothesis. Moreover, the skewed prior probabilities (i.e., soft class labels) of other users for which speaker models are generated can also be leveraged to improve GMM speaker model generation.

Once speaker model 208 is obtained, pattern matching logic 210 may be configured to receive feature(s) extracted from other portion(s) of speech signal 220 (e.g., frame(s) received subsequent to obtaining speaker model 208) and compare such feature(s) to speaker model 208 to generate a measure of confidence 212, which is indicative of the likelihood that the other portion(s) of speech signal 220 are associated with the user who is speaking. Measure of confidence 212 is continuously generated for each portion (e.g., frame) of speech signal 220 that is analyzed. Measure of confidence 212 may be determined based on a degree of similarity between the feature(s) extracted by feature extraction logic 202 and speaker model 208. The greater the similarity between the extracted feature(s) and speaker model 208, the more likely that speech signal 220 is associated with the user whose voice was used to generate speaker model 208. In an embodiment, measure of confidence 212 is a Logarithmic Likelihood Ratio (LLR), which is the logarithm of the ratio of the conditional probability of the current observation given that the current frame being analyzed is spoken by the target speaker divided by the conditional probability of the current observation given that the current frame being analyzed is not spoken by the target speaker.

Measure of confidence 212 is provided to mode selection logic 214. Mode selection logic 214 may be configured to determine whether measure of confidence 212 exceeds a predefined threshold. In response to determining that measure of confidence 212 exceeds the predefined threshold, mode selection logic 214 may enable an SID-assisted mode for communication device 102 that causes the various uplink speech processing algorithms of uplink speech processing logic 206 to operate in a manner that takes into account the identity of the user that is speaking.

Mode selection logic 214 may also provide speaker identification information to the various uplink speech processing algorithms. In an embodiment, the speaker identification information may include an identifier that identifies the near-end user that is speaking. The various uplink speech processing algorithms may use the identifier to obtain speech models and/or parameters optimized for the identified user and process speech accordingly. In an embodiment, the speech models and/or parameters may be obtained, for example, by analyzing portion(s) of a respective version of speech signal 220. In another embodiment, the speech models and/or parameters may be obtained from a storage component of communication device 102 or from a remote storage component on a communication network to which communication device 102 is communicatively connected. It is noted that the speech models and/or parameters described herein are in reference to speech models and/or parameters used by uplink speech processing algorithm(s) and are not to be interpreted as the speaker models used by uplink SID logic 216 as described above.

In an embodiment, the enablement of the SID-assisted algorithm features may be "phased-in" gradually over a certain range of the measure of confidence. For example, the contributions from the SID-assisted algorithm features may be scaled from 0 to 1 gradually as the measure of confidence increases over a certain predefined range.

Mode selection logic 214 may also enable training logic 204 to generate a new speaker model in response to determining that another user is speaking during the same communication session. For example, when another speaker begins speaking, portion(s) of speech signal 220 that are generated when the other user speaks are compared to speaker model(s) 208. The speaker model that speech signal 220 is initially compared to is the speaker model associated with the user that was previously speaking. As such, measure of confidence 212 will be lower, as the feature(s) extracted from speech signal 220 that is generated when the other user speaks will be dissimilar to the speaker model. In response to determining that measure of confidence 212 is below a predefined threshold, mode selection logic 214 determines that another user is speaking. Thereafter, training logic 204 generates a new speaker model for the new user. When measure of confidence 212 associated with the new speaker reaches the predefined threshold, mode selection logic 214 enables the SID-assisted mode for communication device 102 that causes the various uplink speech processing algorithms to operate in a manner that takes into account the identity of the new near-end speaker.

Mode selection logic 214 may also provide speaker identification information that includes an identifier that identifies the new user that is speaking to the various uplink speech processing algorithms. The various uplink speech processing algorithms may use the identifier to obtain speech models and/or parameters optimized for the new near-end user and process speech accordingly.

Each of the speaker models generated by uplink SID logic 216 may be stored in a storage component of communication device 102 or in an entity on a communication network to which communication device 102 may be communicatively connected for subsequent use.

To minimize any degradation of system performance when a new near-end user begins speaking, uplink speech processing logic 206 may be configured to operate in a non-SID assisted mode as long as the measure of confidence generated by uplink SID logic 216 is below a predefined threshold. The non-SID assisted mode may comprise a default operational mode of communication device 102.

It is noted that even in the case where each user only speaks for a short amount of time before another speaker begins speaking (e.g., in speakerphone/conference mode) and measure of confidence 212 does not exceed the predefined threshold, communication device 102 remains in the default non-SID-assisted mode and will perform just as well as a conventional system without any catastrophic effect.

In an embodiment, uplink SID logic 216 may determine the number of different speakers in the conference call and classify speech signal 220 into N clusters, where N corresponds to the number of different speakers.

After identifying the number of users, uplink SID logic 216 may then train and update N speaker models 208. N speaker models 208 may be stored in a storage component of communication device 102 or in an entity on a communication network to which communication device 102 may be communicatively connected. Uplink SID logic 216 may continuously determine which speaker is currently speaking and update the corresponding SID speaker model for that speaker.

If measure of confidence 212 for a particular speaker exceeds the predefined threshold, uplink SID logic 216 may enable the SID-assisted mode for communication device 102 that causes the various uplink speech processing algorithms to operate in a manner that takes into account the identity of that particular near-end speaker. If measure of confidence 212 falls below a predefined threshold (e.g., when another near-end speaker begins speaking), communication device 102 may switch from the SID-assisted mode to the non-SID-assisted mode.

In one embodiment, speaker model(s) 208 may be stored between communication sessions (e.g., in a non-volatile memory of communication device 102 or an entity on a communication network to which communication device 102 may be communicatively connected). In this way, every time a near-end user for which a speaker model is stored speaks during a communication session, uplink SID logic 216 may recognize the near-end user that is speaking without having to generate a speaker model for that near-end user. In this way, mode selection logic 214 of uplink SID logic 216 can immediately switch on the SID-assisted mode and use the speech models and/or parameters optimized for that particular near-end speaker to obtain the maximum performance improvement when that user speaks. Furthermore, speaker model(s) 208 may be continuously updated as additional communication sessions are carried out.

III. Example Uplink Speech Processing Algorithms that Utilize Speaker Identification Information Various uplink speech processing algorithms that utilize speaker identification information to achieve improved performance are described in the following subsections. In particular, Subsection A describes an Acoustic Echo Cancellation stage that performs an acoustic echo cancellation algorithm in a manner that utilizes speaker identification information in accordance with an embodiment herein. Subsection B describes a Multi-Microphone Noise Reduction stage that performs a multi-microphone noise reduction algorithm in a manner that utilizes speaker identification information in accordance with an embodiment herein. Subsection C describes a Single-Channel Noise Reduction stage that performs a single-channel noise reduction algorithm in a manner that utilizes speaker identification information in accordance with an embodiment herein. Subsection D describes a Residual Echo Suppression stage that performs a residual echo suppression algorithm in a manner that utilizes speaker identification information in accordance with an embodiment herein. Subsection E describes a Single-Channel Dereverberation stage that performs a single-channel dereverberation algorithm in a manner that utilizes speaker identification information in accordance with an embodiment herein. Subsection F describes a Wind Noise Reduction stage that performs a wind noise reduction algorithm in a manner that utilizes speaker identification information in accordance with an embodiment herein. Subsection G describes an Automatic Speech Recognition stage that performs an automatic speech recognition algorithm in a manner that utilizes speaker identification information in accordance with an embodiment herein. Lastly, Subsection H describes a Speech Encoding stage that performs a speech encoding algorithm in a manner that utilizes speaker identification information in accordance with an embodiment herein.

A. Acoustic Echo Cancellation (AEC) Stage

Figure 3:
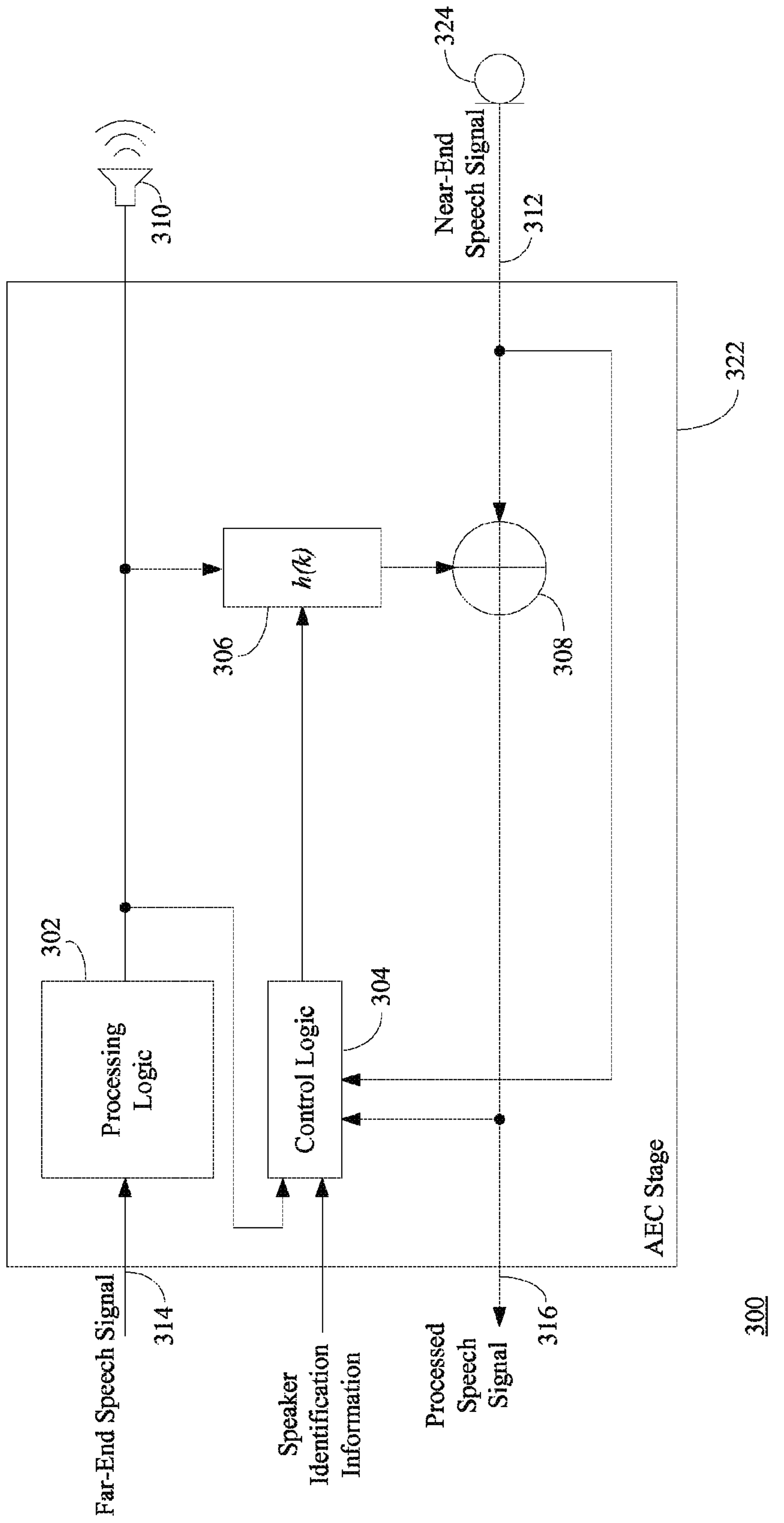
FIG. 3 is a block diagram of an acoustic echo cancellation stage in accordance with an embodiment.

FIG. 3 is a block diagram 300 of an example AEC stage 322 in accordance with an embodiment. AEC stage 322 comprises an example implementation of AEC stage 222 of uplink speech processing logic 206 as described above in reference to FIG. 2.

AEC stage 322 receives a near-end speech signal 312 and a far-end speech signal 314. Near-end speech signal 312 may be a version of a near-end speech signal (e.g., speech signal 220 as shown in FIG. 2) that was received by one or more near-end microphones 324. Far-end speech signal 314 may be received by communication device 102 via a communication network. For example, far-end speech signal 314 may comprise a decoded version of downlink speech signal 124 as described above in reference to FIG. 1.

As shown in FIG. 3, AEC stage 322 includes processing logic 302, control logic 304, adaptive filter 306 and combination logic 308. Processing logic 302 may be configured to process far-end speech signal 314 to render it into a form that is suitable for playback via one or more loudspeakers 310). After processing is complete, the processed version of far-end speech signal 314 is output to one or more respective loudspeakers 310.

As also shown in FIG. 3, the processed version of far-end speech signal 314 is also provided to adaptive filter 306. In an embodiment, adaptive filter 306 is a finite impulse response (FIR) filter having an impulse response h(k), which utilizes filter parameters that are used to filter far-end speech signal 314 to produce an estimated acoustic echo. Impulse response h(k) is intended to model linear portions of the acoustic echo path between loudspeaker(s) 310 and microphone 324. Although not shown in FIG. 3, AEC stage 322 may also include one or more filters that are configured to model non-linear portions of the acoustic echo path, which can also be used to produce the estimated acoustic echo.

Combination logic 308 is configured to subtract the estimated acoustic echo signal from near-end speech signal 312, thereby producing a modified near-end speech signal (i.e., processed speech signal 316). Processed speech signal 316 may then be provided to subsequent uplink speech processing stages for further processing and/or another communication device, such as a far-end audio communication system or device.

The filter parameters are computed by control logic 304. Control logic 304 analyzes near-end speech signal 312, processed speech signal 316 and/or the processed version of far-end speech signal 314 to determine the filter parameters. In an embodiment, control logic 304 uses a gradient-based least-mean-squares (LMS)-type algorithm to update the parameters of adaptive filter 306. However, it will be apparent to persons skilled in the relevant arts that other algorithms may be used (e.g., a recursive LMS-type algorithm). These parameters are updated when the far-end speaker is talking, but when the near-end speaker is not (i.e., a far-end single-talk condition) and are not updated when the near-end speaker is talking and the far-end speaker is not (i.e., a near-end single-talk condition) or when the near-end and far-end speakers are talking simultaneously (i.e. a double-talk condition). The parameters are only updated during a far-end single talk condition because in such a condition far-end speech signal 314 is strong and there is no near-end speech signal to interfere with proper parameter adaptation. SID can improve the identification of when the far-end speaker is talking and when the near-end speaker is talking.

For example, for each portion (e.g., frame) of near-end speech signal 312, control logic 304 may receive speaker identification information from uplink SID logic 216 that includes a measure of confidence that indicates the likelihood that the particular portion of near-end speech signal 312 is associated with a target near-end speaker. Similarly, for each frame of far-end speech signal 314, control logic 304 may receive speaker identification information (e.g., from downlink SID logic, such as downlink SID logic 118 shown in FIG. 1) that includes a measure of confidence that indicates the likelihood that the particular portion of far-end speech signal 314 is associated with a target far-end speaker. The respective measures of confidence will be relatively higher for portions including active speech and will be relatively lower for portions not including speech.

Accordingly, control logic 304 may use the respective measures of confidence to more accurately determine a far-end single-talk condition, a near-end single-talk condition, or a double-talk condition. For example, if the measure of confidence that indicates the likelihood that a particular portion of far-end speech signal 314 is associated with a target far-end speaker is high and the measure of confidence that indicates the likelihood that a particular portion of near-end speech signal 312 is associated with a target near-end speaker is low, this may favor a determination that a far-end single-talk condition has occurred, and the filter parameters of adaptive filter 306 are updated. If the measure of confidence that indicates the likelihood that a particular portion of near-end speech signal 312 is associated with the target near-end speaker is high and the measure of confidence that indicates the likelihood that a particular portion of far-end speech signal 314 is associated with the target far-end speaker is low, this may favor a determination that a near-end single-talk condition has occurred, and the filter parameters of adaptive filter 306 are not updated. Similarly, if the measure of confidence that indicates the likelihood that a particular portion of far-end speech signal 314 is associated with the target far-end speaker is high and the measure of confidence that indicates the likelihood that a particular portion of near-end speech signal 312 is associated with the target near-end speaker is also high, this may favor a determination that a double-talk condition has occurred, and the filter parameters of adaptive filter 306 are not updated.

It is to be understood that the operations performed by the various components of AEC stage 322 are often performed in the time domain. However, it is noted that AEC stage 322 may be modified to operate in the frequency domain. SID can also improve the performance of acoustic echo cancellation techniques that are performed in the frequency domain. Furthermore, AEC methods based on closed-form solutions (as opposed to a gradient-based LMS-type algorithm as described above) such as those described in commonly-owned, co-pending U.S. patent application Ser. No. 13/720,672, entitled "Echo Cancellation Using Closed-Form Solutions" and filed on Dec. 19, 2012, the entirety of which is incorporated by reference as if fully set forth herein, may leverage SID to obtain improved AEC performance. As described in U.S. patent application Ser. No. 13/720,672, closed-form solutions require knowledge of various signal statistics that are estimated from the available signals/spectra, and should accommodate changes to the acoustic echo path. Such changes can occur rapidly and the estimation of the statistics must be able to properly track these changes, which are reflected in the statistics. This suggests using some sort of mean with a forgetting factor, and although many possibilities exist, a suitable approach for obtaining the estimated statistics comprises utilizing a running mean of the instantaneous statistics with a certain leakage factor (also referred to in the following as update rate).

An embodiment of an acoustic echo canceller described in U.S. patent application Ser. No. 13/720,672 accommodates changes to the acoustic echo path by determining a rate for updating the estimated statistics based on a measure of coherence between a frequency domain representation of a far-end speech signal being sent to a loudspeaker and a frequency domain representation of a near-end speech signal received by a microphone on a frequency bin by frequency bin basis. If the measure of coherence for a given frequency bin is low, then desired speech is likely being received via the microphone with little echo being present. However, if the measure of coherence is high, then there is likely to be significant acoustic echo. In accordance with certain embodiments disclosed therein, a high measure of coherence is mapped to a fast update rate for the estimated statistics and a low measure of coherence is mapped to a slow update rate for the estimated statistics, which may include not updating at all.

In addition to or in lieu of determining the measure of coherence, AEC based on a closed-form solution may use SID information to determine the update rate for the estimated statistics. For example, with reference to FIG. 3, for each portion (e.g., frame) of near-end speech signal 312, control logic 304 may receive speaker identification information from uplink SID logic 216 that includes a measure of confidence that indicates the likelihood that the particular portion of near-end speech signal 312 is associated with a target near-end speaker. Similarly, for each frame of far-end speech signal 314, control logic 304 may receive speaker identification information (e.g., from downlink SID logic, such as downlink SID logic 118 shown in FIG. 1) that includes a measure of confidence that indicates the likelihood that the particular portion of far-end speech signal 314 is associated with a target far-end speaker. The respective measures of confidence will be relatively higher for portions including active speech and will be relatively lower for portions including non-speech.

Control logic 304 may use the respective measures of confidence to determine the update rate for the estimated statistics. In particular, control logic 304 may determine the update rate based on whether a far-end single-talk condition, a near-end single-talk condition, or a double-talk condition has occurred. For example, a far-end single talk condition may be mapped to a fast update rate, and a near-end single talk condition or a double-talk condition may be mapped to a slow update rate. The talk condition may be determined in a similar manner to that described above.

Figure 4:
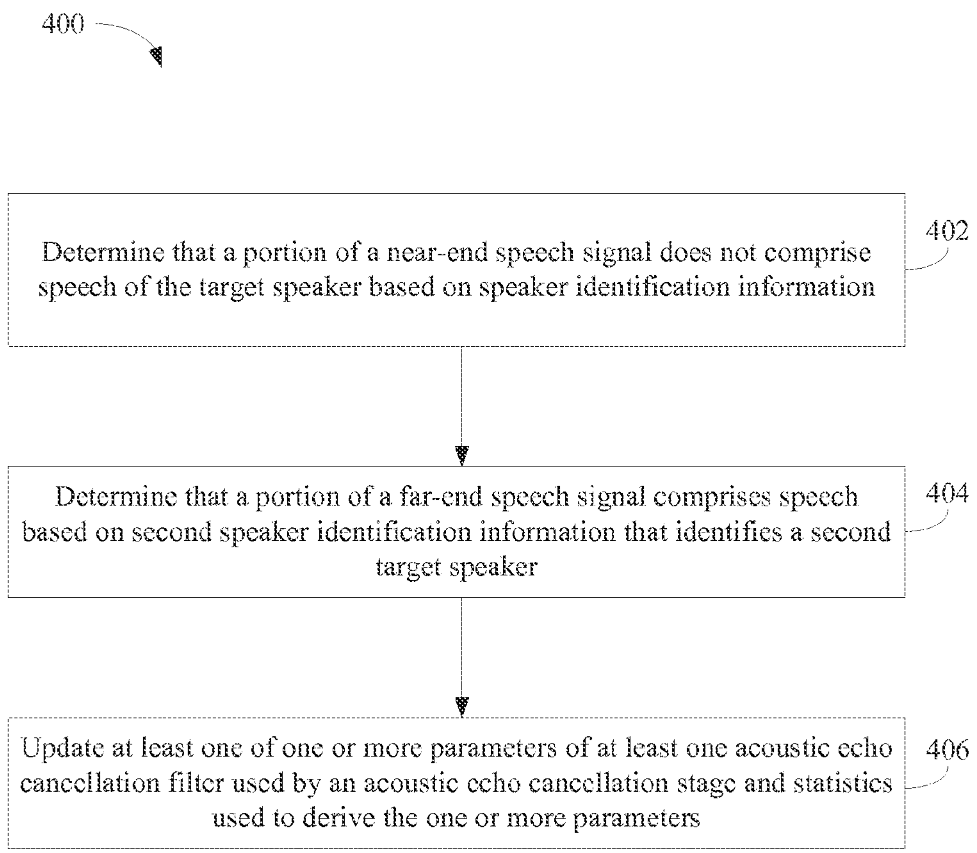
FIG. 4 is a flowchart of a method for performing acoustic echo cancellation based at least in part on the identity of a near-end speaker in accordance with an embodiment.

Accordingly, in embodiments, AEC stage 322 may operate in various ways to perform acoustic echo cancellation based at least in part on the identity of a near-end speaker during a communication session. FIG. 4 depicts a flowchart 400 of an example method for performing acoustic echo cancellation based at least in part on the identity of a near-end speaker during a communication session. The method of flowchart 400 will now be described with continued reference to FIG. 3, although the method is not limited to that implementation. Other structural and operational embodiments will be apparent to persons skilled in the relevant art(s) based on the discussion regarding flowchart 400.

As shown in FIG. 4, the method of flowchart 400 begins at step 402, in which it is determined that a portion of a near-end speech signal does not comprise speech of the target speaker based on speaker identification information. For example, with reference to FIG. 3, control logic 304 determines that a portion of near-end speech signal 312 does not comprise speech of the target speaker (e.g., the target near-end speaker) based on speaker identification information that identifies a target near-end speaker.

At step 404, it is determined that a portion of a far-end speech signal comprises speech based on second speaker identification information that identifies a second target speaker. For example, with reference to FIG. 3, control logic 304 determines that a portion of far-end speech signal 314 comprises speech based on speaker identification information that identifies a target far-end speaker.

At step 406, at least one of one or more parameters of at least one acoustic echo cancellation filter used by an acoustic echo cancellation stage and statistics used to derive the one or more parameters are updated in response to determining that the portion of the near-end speech signal does not comprise speech of the target speaker and determining that the portion of the far-end speech signal comprises speech. For example, with reference to FIG. 3, one or more parameters of adaptive filter 306 used by AEC stage 322 and/or statistics used to derive the parameter(s) are updated in response to determining that a portion of near-end speech signal 312 does not comprise speech of the target speaker and a portion of far-end speech signal 314 comprises speech.

B. Multi-Microphone Noise Reduction (MMNR) Stage

Figure 5:
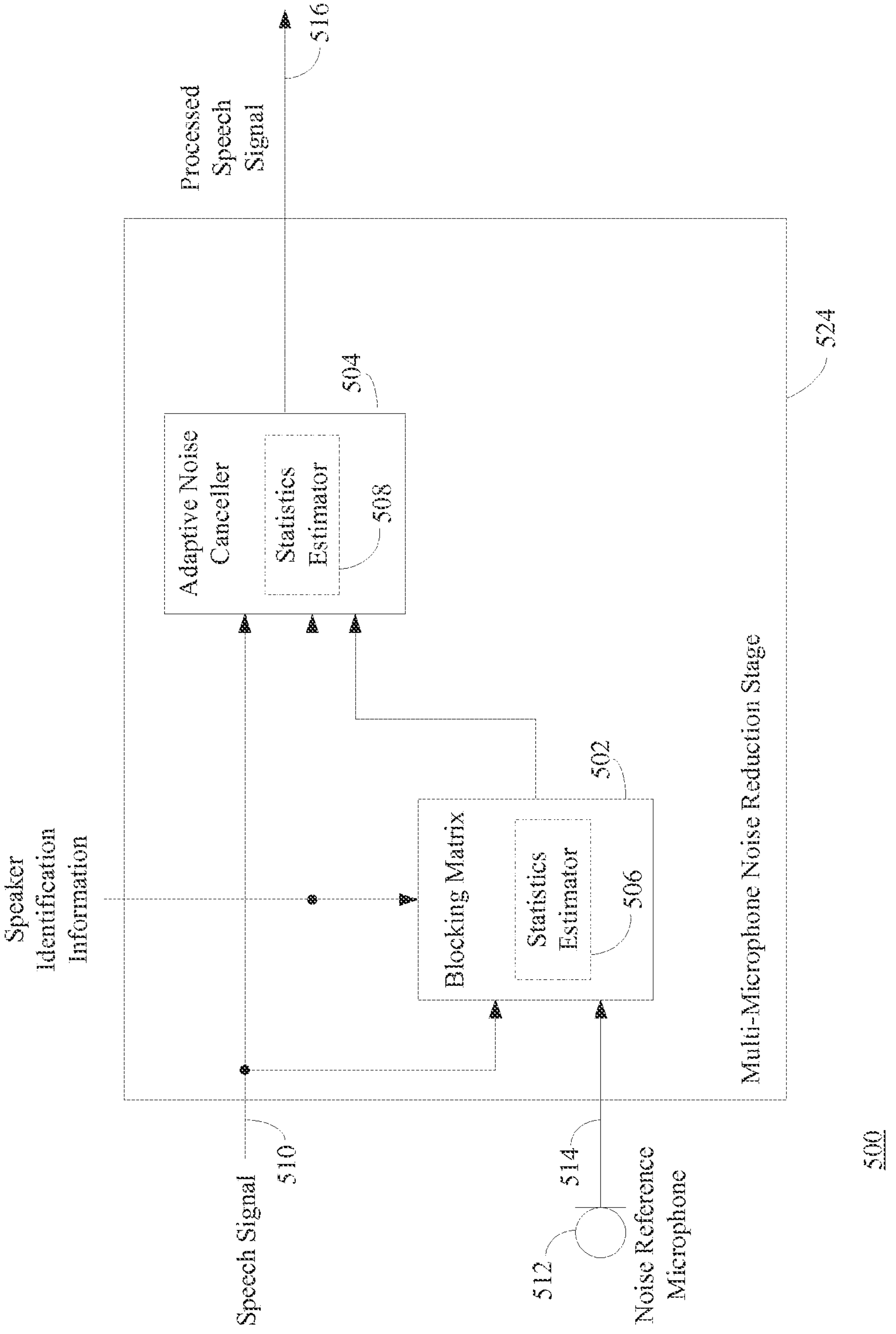
FIG. 5 is a block diagram of a multi-microphone noise reduction stage in accordance with an embodiment.

MMNR stage 224 may be configured to perform multi-microphone noise reduction operations based at least in part on the identity of a near-end speaker during a communication session. FIG. 5 is a block diagram 500 of an example MMNR stage 524 in accordance with such an embodiment. MMNR stage 524 is intended to represent a modified version of a MMNR system described in co-pending, commonly-owned U.S. patent application Ser. No. 13/295,818, entitled "System and Method for Multi-Channel Noise Suppression Based on Closed-Form Solutions and Estimation of Time-Varying Complex Statistics" and filed on Nov. 14, 2011, the entirety of which is incorporated by reference as if fully set forth herein.

MMNR stage 524 comprises an example implementation of MMNR stage 224 of uplink speech processing logic 206 as described above in reference to FIG. 2. MMNR stage 524 receives a speech signal 510 and a reference signal 514. Speech signal 510 may be a version of a near-end speech signal (e.g., speech signal 220 as shown in FIG. 2) that is derived from signals that are received by one or more microphones (e.g., microphone(s) 104, as shown in FIG. 1) and/or previously-processed by one or more uplink speech processing stages (e.g., AEC stage 222, as shown in FIG. 2). In an embodiment in which speech signal 510 is derived from signals received via a plurality of microphones, speech signal 510 may be derived by combining (e.g., via beamforming) each of the signals received from the plurality of microphones into a single speech signal (i.e., speech signal 510). In accordance with certain embodiments, reference signal 514 may be received via a microphone that is dedicated to measuring noise (e.g., noise reference microphone 512) included in communication device 102. In accordance with other embodiments, reference signal 514 may be obtained by using speech signal(s) received from any of the plurality of microphones.

As shown in FIG. 5, MMNR stage 524 includes a blocking matrix 502 and an adaptive noise canceller 504. Blocking matrix 502 may be configured to estimate and remove a desired speech component obtained from speech signal 510 to produce a "cleaner" background noise component. For example, in an embodiment, blocking matrix 502 may include a filter that is configured to filter speech signal 510 to obtain an estimate of the desired speech component in reference signal 514. As noted earlier, reference signal 514 may be received from noise reference microphone 512 or may be derived from speech signal(s) received from a plurality of microphones. Blocking matrix 502 then subtracts the estimated desired speech component from reference signal 514 to obtain the "cleaner" background noise component.

Adaptive noise canceller 504 may be configured to remove an estimated background noise component from speech signal 510. For example, adaptive noise canceller 504 may include a filter that is configured to filter the "cleaner" background noise component obtained by blocking matrix 502 to obtain the estimated background noise component in speech signal 510. Adaptive noise canceller 504 then subtracts the estimated background noise component from speech signal 510 to generate a noise-suppressed speech signal (e.g., processed speech signal 516).

Both blocking matrix 502 and adaptive noise canceller 504 may be improved using SID. For example, for each portion (e.g., frame) of speech signal 510, blocking matrix 502 may receive speaker identification information from uplink SID logic 216 that includes a measure of confidence that indicates the likelihood that the particular portion of speech signal 510 is associated with desired speech (i.e., speech of a target near-end speaker). The measure of confidence will be relatively higher for portions including active speech and will be relatively lower for portions not including speech.

Accordingly, blocking matrix 502 may use the measure of confidence to more accurately estimate the desired speech to be removed from reference signal 514. For example, blocking matrix 502 may determine that a particular portion of speech signal 510 includes desired speech if the measure of confidence for that portion of speech signal 510 is relatively high, and blocking matrix 502 may determine that a particular portion of speech signal 510 does not include desired speech if the measure of confidence for that portion of speech signal 510 is relatively low. Blocking matrix 502 may use the portions of speech signal 510 associated with a relatively high measure of confidence to more accurately estimate the desired speech and remove the estimated desired speech from reference signal 514.

Adaptive noise canceller is benefited by SID by virtue of receiving a more accurate representation of the "cleaner" background noise component, which is then used to estimate the background noise component to be removed from speech signal 510, thereby resulting in an improved noise-suppressed speech signal (e.g., processed speech signal 516). Processed speech signal 516 may be provided to subsequent uplink speech processing stages for further processing and/or another communication device, such as a far-end audio communication system or device.

It is noted that while MMNR stage 524 depicts a multi-microphone noise reduction configuration using a Generalized Sidelobe Canceller (GSC)-like structure, other types of multi-mic noise suppression may be improved using SID. For example and without limitation, co-pending, commonly-owned U.S. patent application Ser. No. 12/897,548, entitled "Noise Suppression System and Method" and filed on Oct. 4, 2010, the entirety of which is incorporated by reference as if fully set forth herein, discloses a multi-microphone noise reduction configuration in accordance with another embodiment. Such a configuration may also be improved using SID.

It is also to be understood that the operations performed by the various components of MMNR stage 524 are often performed in the time domain. However, it is noted that MMNR stage 524 may be modified to perform in the frequency domain. SID can also improve the performance of MMNR techniques that are performed in the frequency domain. Furthermore, U.S. patent application Ser. No. 13/295,818 describes an MMNR based on a closed-form solution. As described in U.S. patent application Ser. No. 13/295,818, closed-form solutions require calculation of time-varying statistics of complex frequency domain signals to determine filter coefficients for filters included in blocking matrix 502 and adaptive noise canceller 504. In accordance with such an embodiment, blocking matrix 502 includes statistics estimator 506, and adaptive noise canceller 504 includes statistics estimator 508. Statistics estimator 506 is configured to estimate desired source statistics, and statistics estimator 508 is configured to estimate background noise statistics. As described in U.S. patent application Ser. No. 13/295,818, the desired source statistics may be updated primarily when the desired source is present in speech signal 510, and the background noise statistics may be updated primarily when the desired source is absent in speech signal 510.

Both statistics estimator 506 and statistics estimator 508 may be improved using SID. For example, for each portion (e.g., frame) of speech signal 510, statistics estimator 506 and statistics estimator 508 may receive speaker identification information from uplink SID logic 216 that includes a measure of confidence that indicates the likelihood that the particular portion of speech signal 510 includes a desired source (e.g., speech associated with a target near-end speaker). The measure of confidence will be relatively higher for portions for which the desired source is present and will be relatively lower for portions for which the desired source is absent. Accordingly, in an embodiment, statistics estimator 506 may update the desired speech statistics when receiving portions of speech signal 510 that are associated with a relatively high measure of confidence, and statistics estimator 508 may update the background noise statistics when receiving portion(s) of speech signal 510 that are associated with a relatively low measure of confidence. In another embodiment, the rates at which the desired speech statistics and the background noise statistics are updated are changed based on the measure of confidence. For example, as the measure of confidence increases, the update rate of the desired speech statistics may be increased, and the update rate of the background noise statistics may be decreased. As the measure of confidence decreases, the update rate of the desired speech statistics may be decreased, and the update rate of the background noise statistics may be increased.

Figure 6:
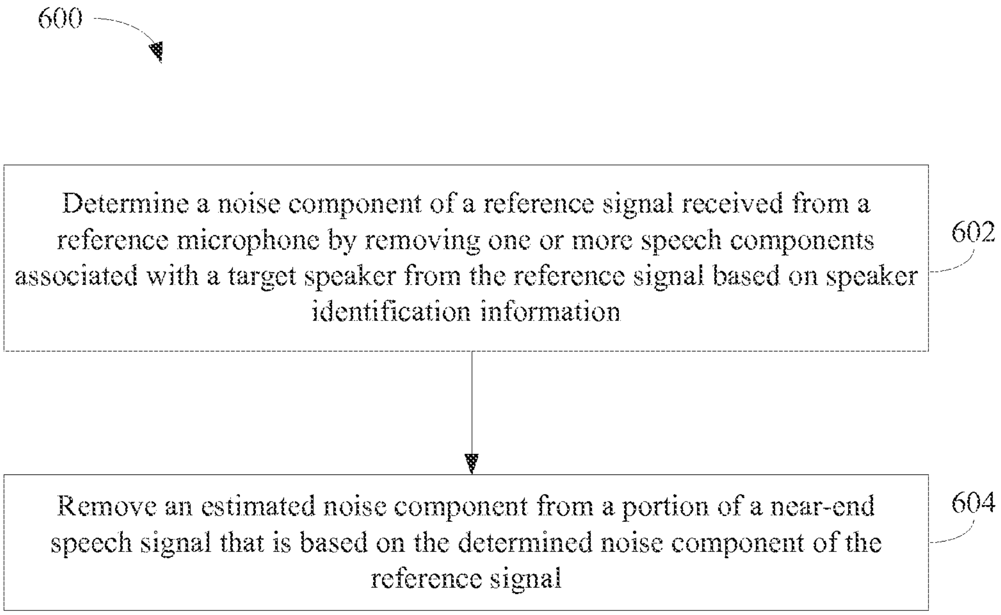
FIG. 6 is a flowchart of a method for performing multi-microphone noise reduction based at least in part on the identity of a near-end speaker in accordance with an embodiment.

Accordingly, in embodiments, MMNR stage 524 may operate in various ways to perform multi-microphone noise reduction based at least in part on the identity of a near-end speaker during a communication session. FIG. 6 depicts a flowchart 600 of an example method for performing multi-microphone noise reduction based at least in part on the identity of a near-end speaker during a communication session. The method of flowchart 600 will now be described with continued reference to FIG. 5, although the method is not limited to that implementation. Other structural and operational embodiments will be apparent to persons skilled in the relevant art(s) based on the discussion regarding flowchart 600.

As shown in FIG. 6, the method of flowchart 600 begins at step 602, in which a noise component of a reference signal received from a reference microphone is determined by removing one or more speech components associated with a target speaker from the reference signal based on speaker identification information. For example, with reference to FIG. 5, blocking matrix 502 determines a "cleaner" background noise component of reference signal 514 received from noise reference microphone 512 by removing one or more desired speech components associated with a target near-end speaker from reference signal 514 based on speaker identification information.

At step 604, an estimated noise component of a portion of a near-end speech signal that is based on the determined noise component of the reference signal is removed from the portion of the near-end speech signal. For example, with reference to FIG. 5, adaptive noise canceller 504 filters the "cleaner" background noise component obtained by blocking matrix 502 to obtain an estimate of the background noise component in speech signal 510. Adaptive noise canceller 504 removes the estimated background noise component from speech signal 510.

In accordance with certain embodiments, step 604 may be performed based on speaker identification information. For example, step 604 may comprise calculating time-varying statistics of complex frequency domain signals based on speaker identification information to determine filter coefficients for filters used to remove an estimated noise component of a portion of a near-end speech signal. For instance, with reference to FIG. 5, for each portion (e.g., frame) of speech signal 510, statistics estimator 508 may receive speaker identification information from uplink SID logic 216 that includes a measure of confidence that indicates the likelihood that the particular portion of speech signal 510 includes a desired source (e.g., speech associated with a target near-end speaker). In an embodiment, statistics estimator 508 may update the background noise statistics when receiving portion(s) of speech signal 510 that are associated with a relatively low measure of confidence. In another embodiment, the rates at which the background noise statistics are updated are changed based on the measure of confidence. Filter(s) included in adaptive noise canceller 504 may use the estimated background noise statistics to determine filter coefficients to suppress the estimated background noise from portion(s) of speech signal 510.

C. Single-Channel Noise Suppression (SCNS) Stage

Figure 7:
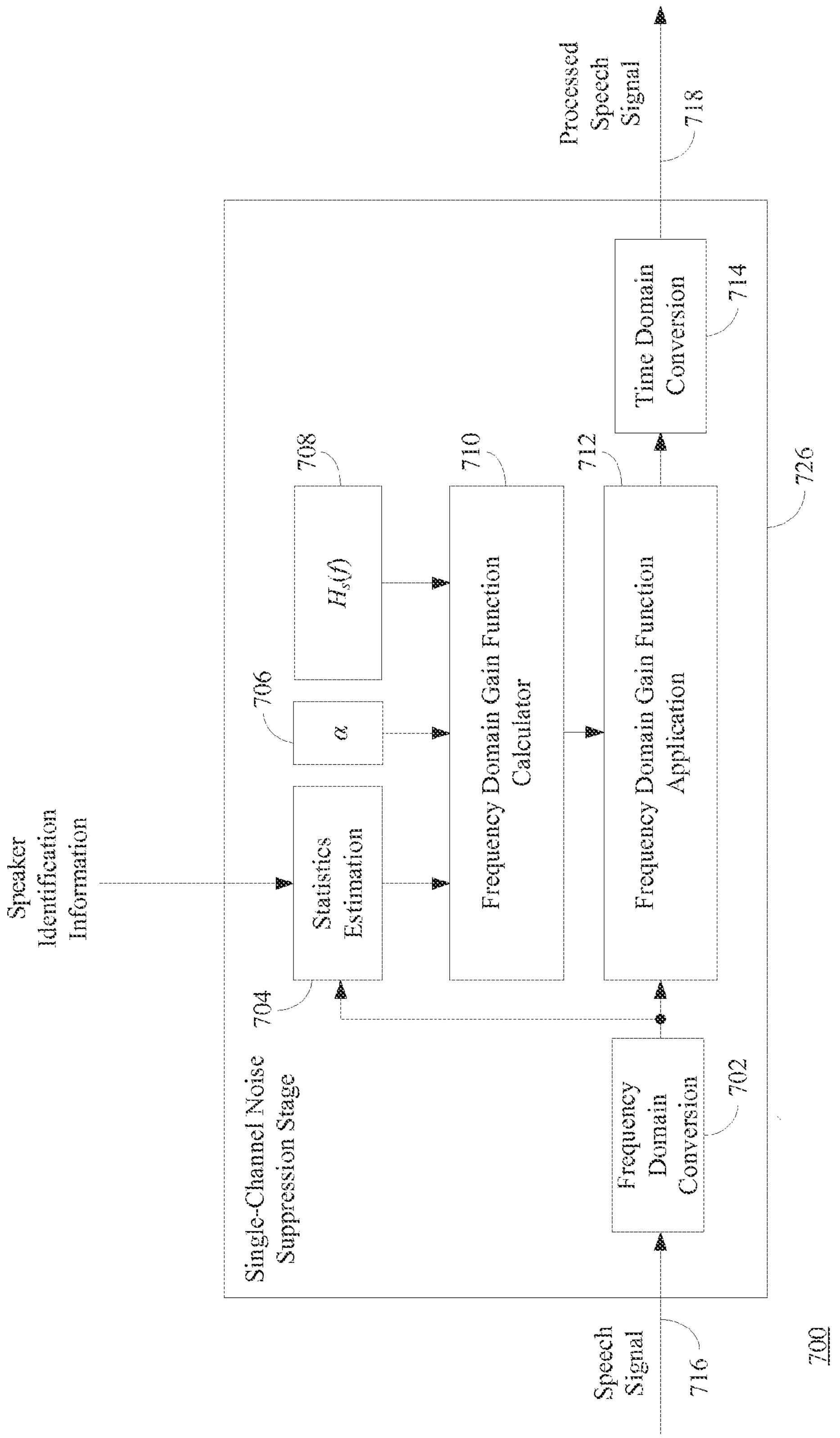
FIG. 7 is a block diagram of a single-channel noise suppression stage in accordance with an embodiment.

SCNS stage 226 may be configured to perform single-channel noise suppression operations based at least in part on the identity of a near-end speaker during a communication session. FIG. 7 is a block diagram 700 of an example SCNS stage 726 in accordance with such an embodiment. SCNS stage 726 is intended to represent a modified version of an SCNS system described in co-pending, commonly-owned U.S. patent application Ser. No. 12/897,548, entitled "Noise Suppression System and Method" and filed on Oct. 4, 2010, the entirety of which is incorporated by reference as if fully set forth herein.

SCNS stage 726 comprises an example implementation of SCNS stage 226 of uplink speech processing logic 206 as described above in reference to FIG. 2. SCNS stage 726 receives speech signal 716. Speech signal 716 may be a version of a near-end speech signal (e.g., speech signal 220 as shown in FIG. 2) that was previously-processed by one or more uplink speech processing stages (e.g., AEC stage 222 and/or MMNR stage 224 as shown in FIG. 2).

As shown in FIG. 7, SCNS stage 726 includes a frequency domain conversion block 702, a statistics estimation block 704, a first parameter provider block 706, a second parameter provider block 708, a frequency domain gain function calculator 710, a frequency domain gain function application block 712 and a time domain conversion block 714.

Frequency domain conversion block 702 may be configured to receive a time domain representation of speech signal 716 and to convert it into a frequency domain representation of speech signal 716.

Statistics estimation block 704 may be configured to calculate and/or update estimates of statistics associated with speech signal 716 and noise components of speech signal 716 for use by frequency domain gain function calculator 710 in calculating a frequency domain gain function to be applied by frequency domain gain function application block 712. In certain embodiments, statistics estimation block 704 estimates the statistics by estimating power spectra associated with speech signal 716 and power spectra associated with the noise components of speech signal 716.

In an embodiment, statistics estimation block 704 may estimate the statistics of the noise components during non-speech portions of speech signal 716, premised on the assumption that the noise components will be sufficiently stationary during valid speech portions of speech signal 716 (i.e., portions of speech 716 that include desired speech components). In accordance with such an embodiment, statistics estimation block 704 includes functionality that is capable of classifying portions of speech signal 716 as speech or non-speech portions. Such functionality may be improved using SID.

For example, statistics estimation block 704 may receive speaker identification information from uplink SID logic 216 that includes a measure of confidence that indicates the likelihood that a particular portion of speech signal 716 is associated with a target near-end speaker. It is likely that the measure of confidence will be relatively higher for portions including speech originating from the target speaker and will be relatively lower for portions including non-speech or speech originating from a talker different from the target speaker. Accordingly, statistics estimation block 704 cannot only use the measure of confidence to more accurately classify portions of speech signal 716 as being speech portions or non-speech portions and estimate statistics of the noise components during non-speech portions, but it can also use the measure of confidence to classify non-target speech or other non-stationary noise as noise, which can be suppressed. This in contrast to conventional SCNS, where only stationary noise is suppressible.

In accordance with certain embodiments, the rate at which the statistics of the noise components of speech signal 216 are updated is changed based on the measure of confidence. For example, as the measure of confidence decreases, the update rate of the noise components may be increased. As the measure of confidence increases, the update rate of the statistics of the noise components may be decreased.

First parameter provider block 706 may be configured to obtain a value of a parameter α that specifies a degree of balance between distortion of the desired speech components and unnaturalness of a residual noise components that are typically included in a noise-suppressed speech signal and to provide the value of the parameter α to frequency domain gain function calculator 710.

Second parameter provider block 708 may be configured to provide a frequency-dependent noise attenuation factor, $H_s(f)$, to frequency domain gain function calculator 710 for use in calculating a frequency domain gain function to be applied by frequency domain gain function application block 712.

In certain embodiments, first parameter provider block 706 determines a value of the parameter α based on the value of the frequency-dependent noise attenuation factor, $H_s(f)$, for a particular sub-band. Such an embodiment takes into account that certain values of α may provide a better trade-off between distortion of the desired speech components and unnaturalness of the residual noise components at different levels of noise attenuation.

Frequency domain gain function calculator 710 may be configured to obtain, for each frequency sub-band, estimates of statistics associated with speech signal 716 and the noise components of speech signal 716 from statistics estimation block 704, the value of the parameter α that specifies the degree of balance between the distortion of the desired speech signal and the unnaturalness of the residual noise signal of the noise-suppressed speech signal provided by first parameter provider block 706, and the value of the frequency-dependent noise attenuation factor, $H_s(f)$ provided by second parameter provider block 708. Frequency domain gain function calculator 710 then uses the estimates of statistics associated with speech signal 716 and the noise components of speech signal 716 to determine a signal-to-noise (SNR) ratio. The SNR ratio, along with the value of parameter α and the value of the frequency-dependent noise attenuation factor $H_s(f)$, are used to calculate a frequency domain gain function to be applied by frequency domain gain function application block 712.

Frequency domain gain function application block 712 is configured to multiply the frequency domain representation of the speech signal 716 received from frequency domain conversion block 702 by the frequency domain gain function constructed by frequency domain gain function calculator 710 to produce a frequency domain representation of a noise-suppressed audio signal. Time domain conversion block 714 receives the frequency domain representation of the noise-suppressed audio signal and converts it into a time domain representation of the noise-suppressed audio signal, which it then outputs (e.g., as processed speech signal 718). Processed speech signal 718 may be provided to subsequent uplink speech processing stages for further processing and/or another communication device, such as a far-end audio communication system or device.

It is noted that the frequency domain and time domain conversions of the speech signal to which noise suppression is applied may occur in other uplink speech processing stages.

Additional details regarding the operations performed by frequency domain conversion block 702, statistics estimation block 704, first parameter provider block 706, second parameter provider block 708, frequency domain gain function calculator 710, frequency domain gain function application block 712 and time domain conversion block 714 may be found in aforementioned U.S. patent application Ser. No. 12/897,548, the entirety of which has been incorporated by reference as if fully set forth herein. Although a frequency-domain implementation of SCNS stage 726 is depicted in FIG. 7, it is to be understood that time-domain implementations may be used as well and may benefit from SID. Furthermore, it is noted that SCNS stage 726 is just one example of how SCNS may be implemented. Other implementations of SCNS may also benefit from SID.

Figure 8:
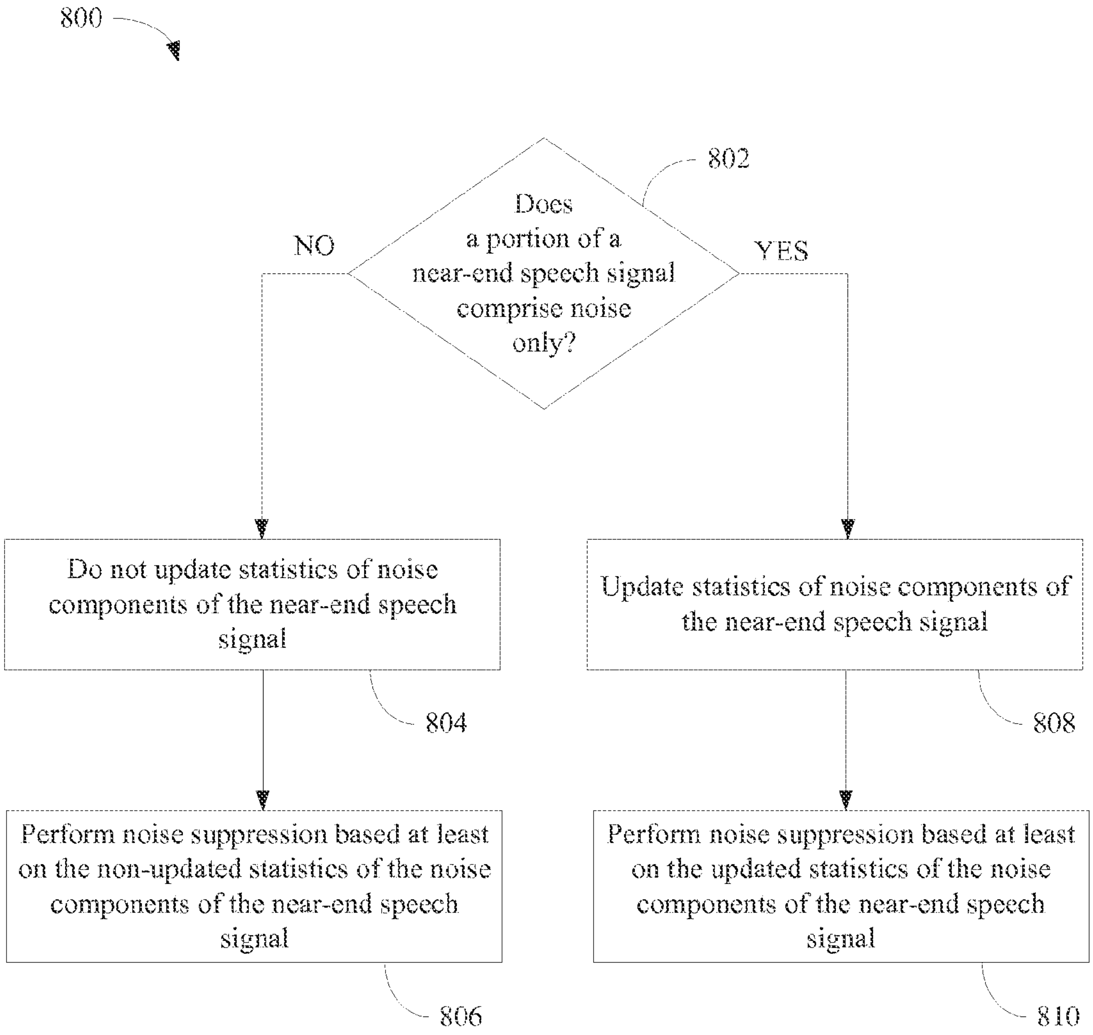
FIG. 8 is a flowchart of a method for performing single-channel noise suppression based at least in part on the identity of a near-end speaker in accordance with an embodiment.

Accordingly, in embodiments, SCNS stage 726 may operate in various ways to perform single-channel noise suppression based at least in part on the identity of a near-end speaker during a communication session. FIG. 8 depicts a flowchart 800 of an example method for performing single-channel noise suppression based at least in part on the identity of a near-end speaker during a communication session. The method of flowchart 800 will now be described with continued reference to FIG. 7, although the method is not limited to that implementation. Other structural and operational embodiments will be apparent to persons skilled in the relevant art(s) based on the discussion regarding flowchart 800.

As shown in FIG. 8, the method of flowchart 800 begins at step 802, in which a determination is made as to whether a portion of a near-end speech signal comprises noise only based at least in part on the speaker identification information. For example, with reference to FIG. 7, statistics estimation block 704 determines whether a portion of speech signal 716 comprises noise only based on speaker identification information that identifies a target near-end speaker. In accordance with embodiments described herein, noise may comprise at least one of speech from a non-target speaker, non-stationary noise, and stationary noise. If it is determined that the portion of the near-end speech signal comprises noise only, flow continues to step 808. Otherwise, if the portion of the near-end speech signal comprises desired speech or a combination of desired speech and noise, flow continues to step 804.

At step 804, statistics of the noise components of the near-end speech signal are not updated.

At step 806, noise suppression is performed on the near-end speech signal based at least on the non-updated statistics of the noise components of the near-end speech signal. In accordance with an embodiment, estimated statistics of speech signal 716 are used with an existing set of estimated statistics of noise components of speech signal 716 to obtain an SNR ratio. Frequency domain gain function application block 712 may perform noise suppression based on the SNR ratio.

At step 808, statistics of noise components of the near-end speech signal are updated. For example, with reference to FIG. 7, statistics estimation block 704 updates the statistics of noise components of a frequency domain representation of speech signal 716.

At step 810, noise suppression is performed on the near-end speech signal based at least on the updated statistics of the noise components. For example, with reference to FIG. 7, frequency domain gain function application block 712 performs noise suppression on a frequency domain representation of speech signal 716 based at least on the updated statistics of the noise components. For instance, in accordance with an embodiment, the updated statistics of the noise components are used with estimated statistics of speech signal 716 to obtain an SNR ratio. Frequency domain gain function application block 712 may perform noise suppression based on the SNR ratio.

D. Residual Echo Suppression (RES) Stage

The acoustic echo cancellation process, for example, performed by AEC stage 322, may sometimes result in what is referred to as a residual echo. The residual echo comprises acoustic echo that is not completely removed by the acoustic echo cancellation process. This may occur as a result of a deficient length of the adaptive filter (e.g., adaptive filter 306, as shown in FIG. 3) used to cancel acoustic echo, a mismatch between a true and an estimated acoustic echo, and/or non-linear signal components that were not cancelled, for example. To eliminate the residual echo, a residual echo suppression process, for example, a non-linear processing (NLP) function, may be performed to suppress the residual echo. As will be described below, residual echo suppression can be improved by taking into account at least the identity of a target near-end speaker during a communication session.

Figure 9:
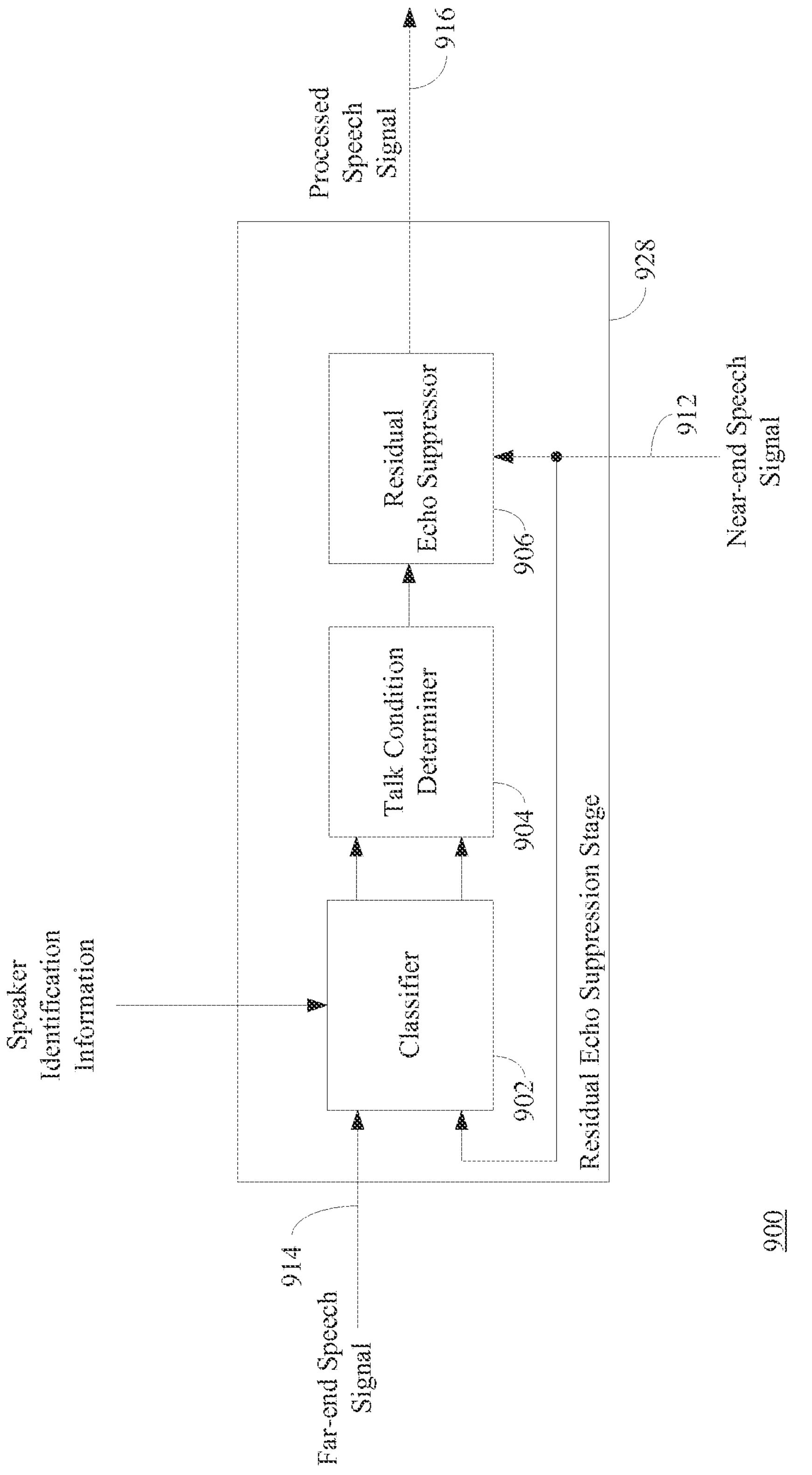
FIG. 9 is a block diagram of a residual echo suppression stage in accordance with an embodiment.

FIG. 9 is a block diagram 900 of an example RES stage 928 in accordance with an embodiment. RES stage 928 comprises an example implementation of RES stage 228 of uplink speech processing logic 206 as described above in reference to FIG. 2.

RES stage 928 receives near-end speech signal 912 and far-end speech signal 914. Near-end speech signal 912 may be a version of a near-end speech signal (e.g., speech signal 220 as shown in FIG. 2) that was previously-processed by one or more uplink speech processing stages (e.g., AEC stage 222, MMNR stage 224, and/or SCNS stage 226, as shown in FIG. 2). Far-end speech signal 914 may be received by communication device 102 via a communication network. For example, far-end speech signal 914 may comprise a decoded version of downlink speech signal 124 as described above in reference to FIG. 1.

As shown in FIG. 9, RES stage 928 includes classifier 902, talk condition determiner 904 and residual echo suppressor 906. Classifier 902 receives near-end speech signal 912 and far-end speech signal 914. Classifier 902 may be configured to determine whether or not portion(s) of near-end speech signal 912 and far-end speech signal 914 comprise active speech or non-speech based on speaker identification information.

For example, for each portion (e.g., frame) of near-end speech signal 912, classifier 902 may receive speaker identification information from uplink SID logic 216 that includes a measure of confidence that indicates the likelihood that the particular portion of near-end speech signal 912 is associated with a target near-end speaker. Similarly, for each frame of far-end speech signal 914, classifier 902 may receive speaker identification information (e.g., from downlink SID logic, such as downlink SID logic 118 shown in FIG. 1) that includes a measure of confidence that indicates the likelihood that the particular portion of far-end speech signal 914 is associated with a target far-end speaker. The respective measures of confidence will be relatively higher for portions including active speech and will be relatively lower for portions not including speech. Accordingly, classifier 902 may use the respective measures of confidence to more accurately determine whether or not a particular portion of near-end speech signal 912 and/or far-end speech signal 914 contains active speech or non-speech.

Talk condition determiner 904 receives the respective classification for portion(s) of near-end speech signal 912 and far-end speech signal 914 and determines the talk condition based on the classifications. For example, in response to determining that a portion of far-end speech signal 914 comprises active speech and that a portion near-end speech signal 912 comprises non-speech, talk condition determiner 904 may determine that the talk condition is a far-end single talk condition. In contrast, in response to determining that a portion of near-end speech signal 912 comprises active speech and that a portion far-end speech signal 914 comprises non-speech, talk condition determiner 904 may determine that the talk condition is a near-end single talk condition.

Residual echo suppressor 906 receives the determination from talk condition determiner 904 and performs operations based on the determination. For example, in response to a determination that the talk condition is a far-end single talk condition, residual echo suppressor 906 may be configured to apply residual echo suppression to the portion of near-end speech signal 912 and output a version of near-end speech signal 912 that has had its residual echo suppressed (i.e., processed speech signal 916), which is provided to subsequent uplink speech processing stages for further processing and/or another communication device, such as a far-end audio communication system or device.

In response to a determination that the talk condition is a near-end single talk condition, residual echo suppression is not performed and near-end speech signal 912 is passed unchanged to minimize any distortion to near-end speech signal 912. As shown in FIG. 9, unmodified near-end speech signal 912 is provided as processed speech signal 916.

In an embodiment, residual echo suppression is still applied during a near-end single talk condition, however to a lesser degree than during a far-end single talk condition. That is, the degree of residual echo suppression applied may be greater in a far-end single-talk condition than in a near-end single talk condition.

In another embodiment, the degree of residual echo suppression applied is a function of the respective measures of confidence. For example, the degree of residual echo suppression applied may be based on a difference of magnitude between the measure of confidence associated with near-end speech signal 912 and the measure of confidence associated with far-end speech signal 914. For instance, if the measure of confidence associated with far-end speech signal 914 is higher than the measure of confidence associated with near-end speech signal 912, the degree of residual echo suppression applied increases as the magnitude difference between such measures of confidence increases. It is noted that if the measure of confidence associated with far-end speech signal 914 is lower than the measure of confidence with near-end speech signal 912, residual echo suppression may not be applied, as such a condition may be representative of a near-end single talk condition.

In accordance with an embodiment, residual echo suppressor 906 is configured to apply residual echo suppression on near-end speech signal 912 on a frequency bin by frequency bin basis. In accordance with such an embodiment, classifier 902 is configured to receive a measure of confidence for each frequency sub-band for each of near-end speech signal 912 and far-end speech signal 914. In further accordance with such an embodiment, talk condition determiner 904 determines the talk condition on a frequency sub-band basis using these measures of confidence. Accordingly, residual echo suppressor 906 may be configured to apply residual echo suppression on frequency sub-bands that are predominantly far-end speech (i.e., residual echo suppression is applied to frequency sub-bands for which a far-end single-talk condition is present) and not apply residual echo suppression on frequency sub-bands that are predominately near-end speech (i.e., residual echo suppression is not applied to frequency sub-bands for which a near-end single-talk condition is present). Such a technique can be used to apply residual echo suppression even during double talk conditions where both the far-end speaker and the near-end speaker are talking at the same time, as certain frequency sub-bands during such a condition may only include far-end speech or near-end speech.

Figure 10:
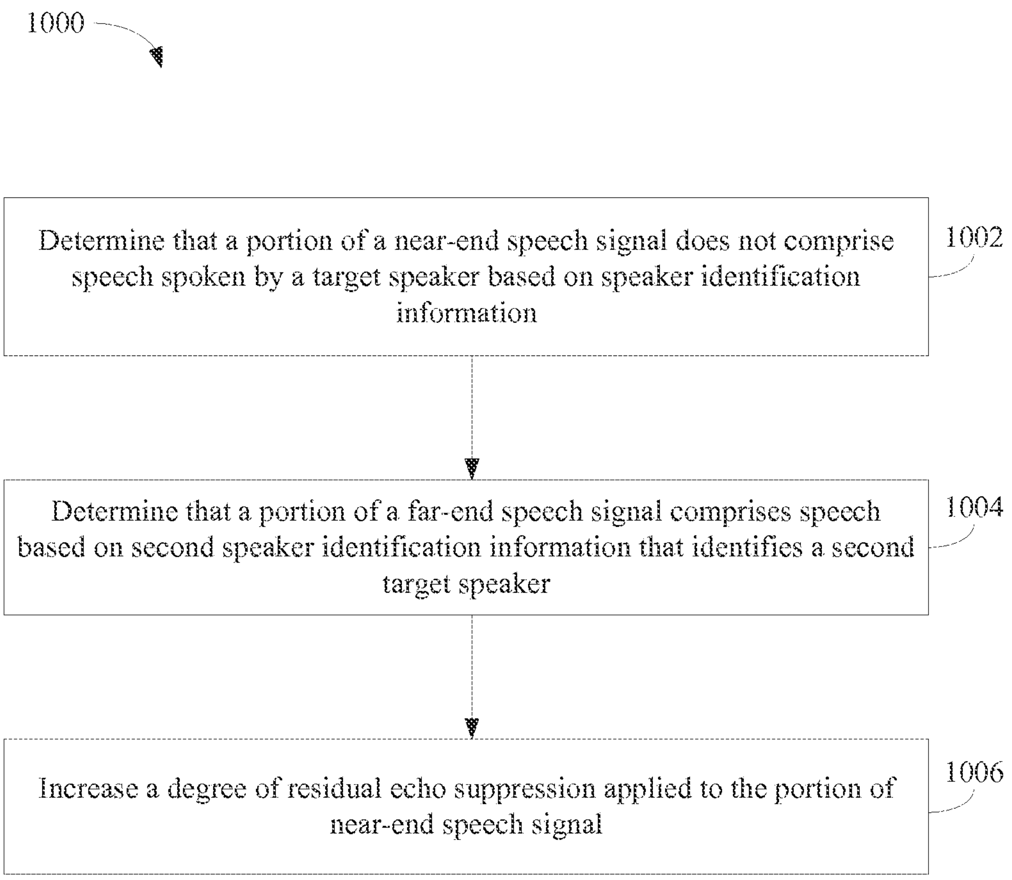
FIG. 10 is a flowchart of a method for performing residual echo suppression based at least in part on the identity of a near-end speaker in accordance with an embodiment.

Accordingly, in embodiments, RES stage 928 may operate in various ways to perform residual echo suppression based at least in part on the identity of a near-end speaker during a communication session. FIG. 10 depicts a flowchart 1000 of an example method for performing residual echo suppression based at least in part on the identity of a near-end speaker during a communication session. The method of flowchart 1000 will now be described with continued reference to FIG. 9, although the method is not limited to that implementation. Other structural and operational embodiments will be apparent to persons skilled in the relevant art(s) based on the discussion regarding flowchart 1000.

As shown in FIG. 10, the method of flowchart 1000 begins at step 1002, in which it is determined that a portion of a near-end speech signal does not comprise speech spoken by a target speaker (e.g., the near-end speaker) based on speaker identification information. For example, with reference to FIG. 9, classifier 902 determines that a portion of near-end speech signal 912 does not comprise speech spoken by a near-end speaker based on speaker identification information.

At step 1004, it is determined that a portion of a far-end speech signal comprises speech based on second speaker identification information that identifies a second target speaker. For example, with reference to FIG. 9, classifier 902 determines that a portion of far-end speech signal 914 comprises speech based on speaker identification information (e.g., received from downlink SID logic, such as downlink SID logic 118 shown in FIG. 1)) that identifies a far-end target speaker. The classifications of classifier 902 are then provided to talk condition determiner 904, which determines the talk condition based on the classifications.

At step 1006, a degree of residual echo suppression that is applied to the near-end speech signal is increased in response to determining that the portion of the near-end speech signal does not comprise speech spoken by the target speaker and the portion of the far-end speech signal comprises speech. For example, with reference to FIG. 9, residual echo suppressor 906 increases a degree of residual echo suppression applied to the portion of near-end speech signal 912 in response to talk condition determiner 904 determining that the talk condition is a far-end single talk condition based on the classifications provided by classifier 902.

E. Single-Channel Dereverberation (SCD) Stage

Single-channel dereverberation approaches often use noise reduction-like schemes where early and late reflection models are calculated based on an estimated time required for reflections of a direct sound to decay 60 decibels in an acoustic space. This estimated time is referred to as $RT_{60}$. The attenuation is then performed based on the estimated $RT_{60}$ using a noise suppression rule. The noise suppression rule may be applied, for example, by a Weiner filter, a minimum mean-square error (MMSE) short-time spectral amplitude (STSA) estimator, etc. It will be apparent to persons skilled in the relevant art that other algorithms may be used to apply a noise suppression rule. As will be described below, the performance of the single-channel dereverberation can be further improved by incorporating SID.

Figure 11:
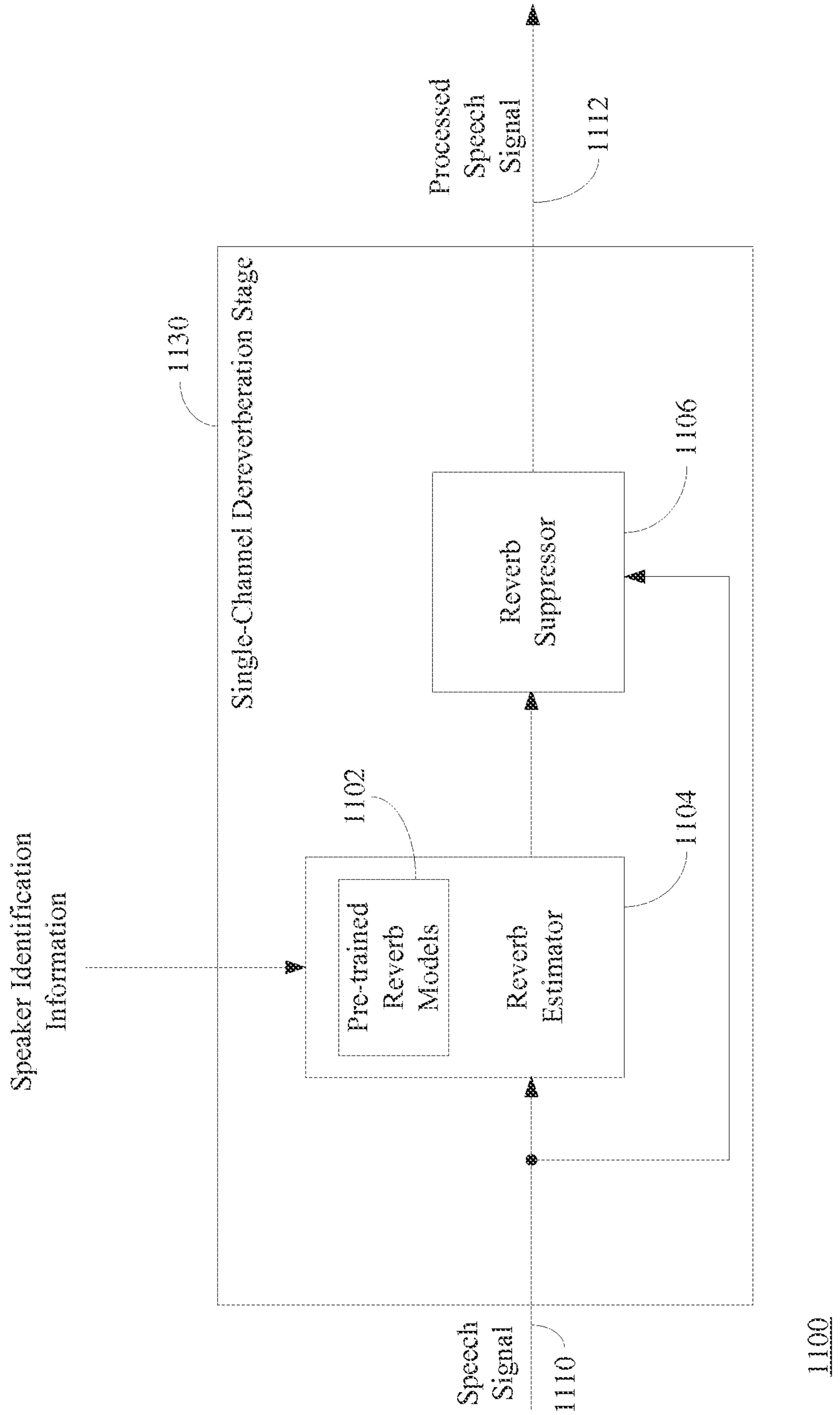
FIG. 11 is a block diagram of a single-channel dereverberation stage in accordance with an embodiment.

FIG. 11 is a block diagram 1100 of an example SCD stage 1130 in accordance with an embodiment. SCD stage 1130 comprises an example implementation of SCD stage 230 of uplink speech processing logic 206 as described above in reference to FIG. 2.

SCD stage 1130 receives speech signal 1110, which may be a version of a near-end speech signal (e.g., speech signal 220 as shown in FIG. 2) that was previously-processed by one or more uplink speech processing stages (e.g., AEC stage 222, MMNR stage 224, SCNS stage 226, and/or RES stage 228 as shown in FIG. 2).

As shown in FIG. 11, SCD stage 1130 includes a reverb estimator 1104 and a reverb suppressor 1106. Reverb estimator 1104 may be configured to estimate the $RT_{60}$ of speech signal 1110. In an embodiment, reverb estimator 1104 uses pre-trained reverb models 1102 to estimate the $RT_{60}$ of speech signal 1110. Pre-trained reverb models 1102 may be generated using artificial reverberated speech with various degree of $RT_{60}$ that correspond to different environments. Pre-trained reverb models 1102 are generated based on a speaker model (e.g., speaker model 208, as described above in reference to FIG. 2) that is associated with the target near-end speaker associated with speech signal 1110.

Reverb estimator 1104 may be configured to compare features of speech signal 1110 to pre-trained reverb models 1102 to determine a respective measure of similarity. Each measure of similarity may be indicative of a degree of similarity between speech signal 1110 and a particular model. The greater the similarity between speech signal 1110 and a particular model, the more likely that speech signal 1110 is associated with that model.

In an embodiment, the estimated $RT_{60}$ of the model associated with the highest measure of similarity is provided to reverb suppressor 1106, and reverb suppressor 1106 suppresses the reverb (in particular, the late reverberant energy) of speech signal 1110 in accordance with a noise suppression rule applied by a Weiner filter, MMSE-STSA estimator, etc.

In another embodiment, reverb suppressor 1106 suppresses the reverb included in speech signal 1110 based on a weighted combination of each of the measures of similarity. For example, reverb suppressor 1106 may receive an estimated $RT_{60}$ for each model and suppress the reverb included in speech signal 1110 in accordance with a weighted combination of the estimated $RT_{60}$s, where the weighted combination is obtained by assigning more weight to estimated $RT_{60}$s associated with higher measures of similarity than that assigned to estimated $RT_{60}$s associated with lower measures of similarity.

Figure 12:
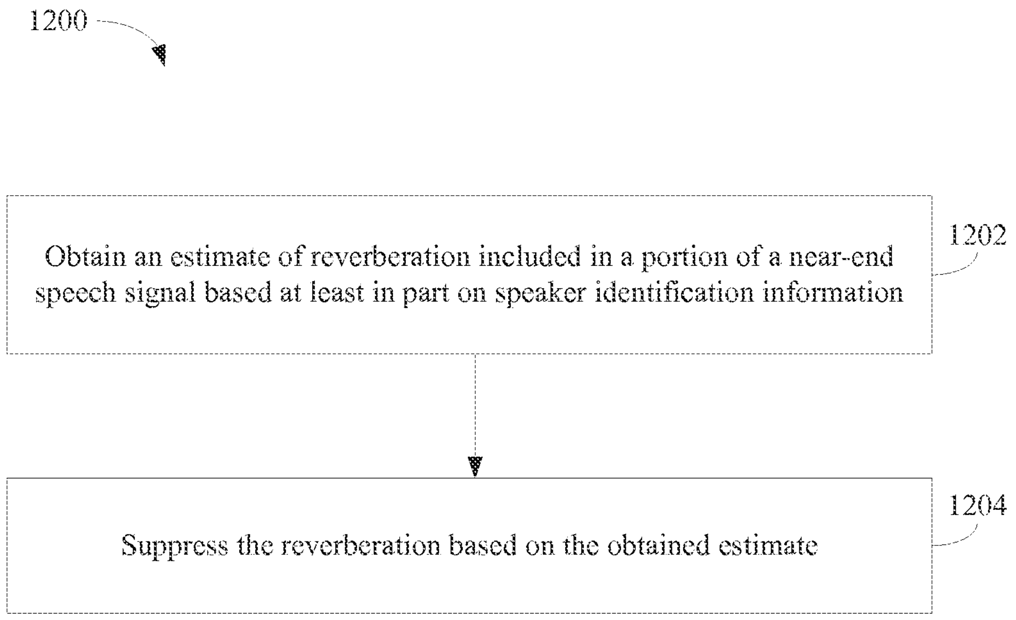
FIG. 12 is a flowchart of a method for performing single-channel dereverberation based at least in part on the identity of a near-end speaker in accordance with an embodiment.

Accordingly, in embodiments, SCD stage 1130 may operate in various ways to perform single-channel dereverberation based at least in part on the identity of the near-end speaker during a communication session. FIG. 12 depicts a flowchart 1200 of an example method for performing single-channel dereverberation based at least in part on the identity of the near-end speaker during a communication session. The method of flowchart 1200 will now be described with continued reference to FIG. 11, although the method is not limited to that implementation. Other structural and operational embodiments will be apparent to persons skilled in the relevant art(s) based on the discussion regarding flowchart 1200.

As shown in FIG. 12, the method of flowchart 1200 begins at step 1202. At step 1202, an estimate of reverberation included in a portion of a near-end speech signal is obtained based at least in part on speaker identification information. For example, as shown in FIG. 11, reverb estimator 1104 provides an estimated $RT_{60}$ associated with a portion of speech signal 1110 based at least in part on speaker identification information. For instance, reverb estimator 1104 may compare portion(s) of speech signal 1110 to different pre-trained reverb models 1102 to determine a measure of similarity associated with each model. In an embodiment, the estimated $RT_{60}$ of the model associated with the highest measure of similarity is used to suppress the reverberation. In another embodiment, a weighted combination of the estimated $RT_{60}$s for each model is used to suppress the reverberation.

At step 1204, the reverberation is suppressed based on the obtained estimate. For example, as shown in FIG. 11, reverb suppressor 1106 suppresses the reverberation included in speech signal 1110 based on estimated $RT_{60}$(s) obtained by reverb estimator 1104.

F. Wind Noise Reduction (WNR) Stage

In practical approaches to the problem of single-channel wind noise reduction, an adaptive high pass filter is applied to a speech signal to attenuate the energy of the wind noise which is found in the lower spectrum. The attenuation level of the filter, as well as its cutoff frequency, are made to vary in time, depending on the classification of a portion of the speech signal as wind only, speech only, or a mixture of both. As will be described below, the performance of single-channel wind noise reduction can be further improved by using SID.

Figure 13:
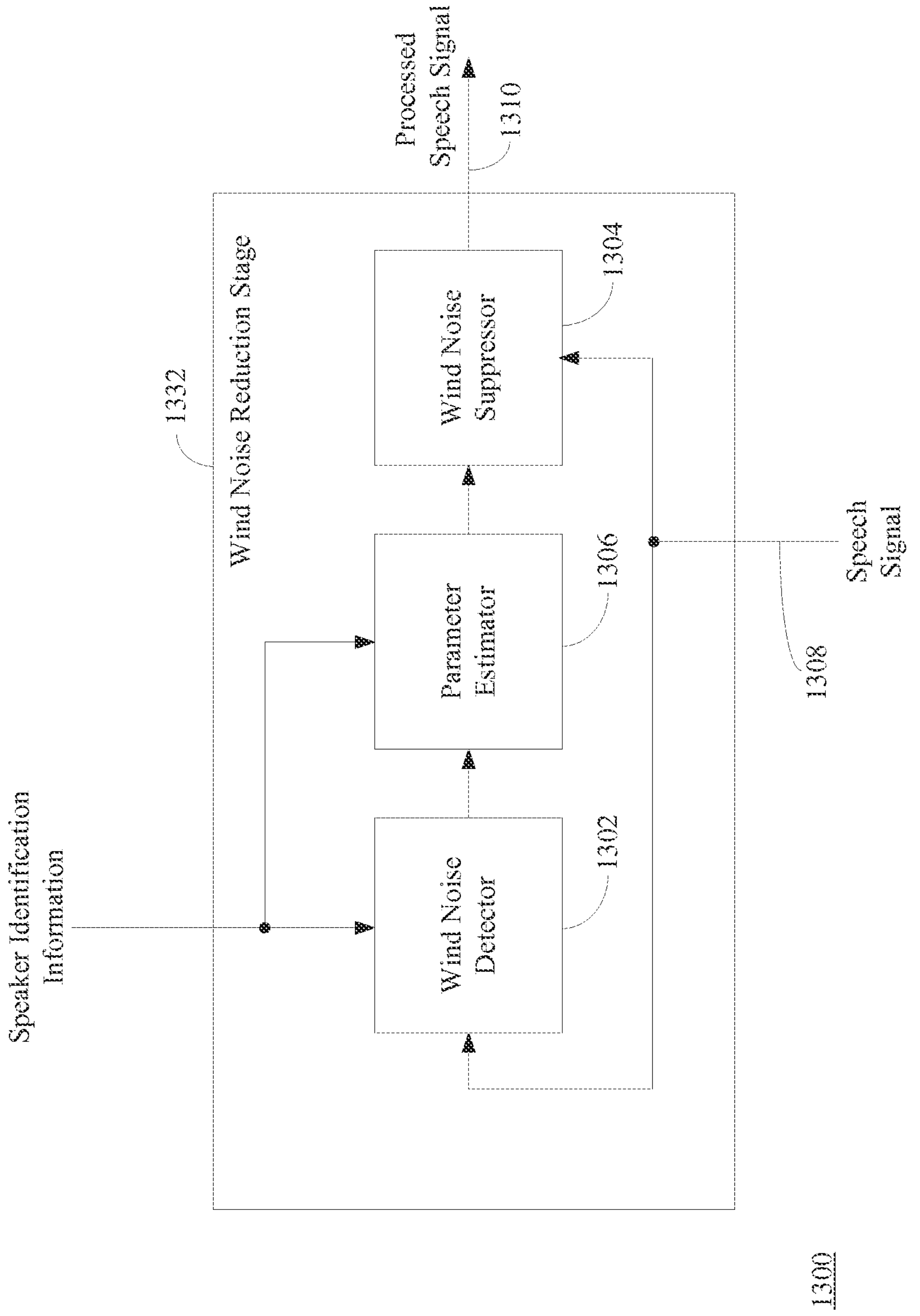
FIG. 13 is a block diagram of a single-channel wind noise reduction stage in accordance with an embodiment.

FIG. 13 is a block diagram 1300 of an example WNR stage 1332 in accordance with an embodiment. WNR stage 1332 comprises an example implementation of WNR stage 232 of uplink speech processing logic 206 as described above in reference to FIG. 2.

WNR stage 1332 receives speech signal 1308, which may be a version of a near-end speech signal (e.g., speech signal 220 as shown in FIG. 2) that was previously-processed by one or more uplink speech processing stages (e.g., AEC stage 222, MMNR stage 224, SCNS stage 226, RES stage 228 and/or SCD stage 230 as shown in FIG. 2).

As shown in FIG. 13, WNR stage 1332 includes a wind noise detector 1302, wind noise suppressor 1304 and a parameter estimator 1306. In an embodiment, WNR stage 1332 is configured to perform single-channel wind noise reduction on a portion of speech signal 1308 based on whether the portion of speech signal 1308 comprises speech or wind noise.

In accordance with such an embodiment, wind noise detector 1302 may be configured to determine whether portion(s) of speech signal 1308 comprise a desired source only (e.g., a target near-end speaker), a non-desired source only (e.g., a non-target near-end speaker, background noise, etc.), wind noise only, or a combination thereof). Wind noise detector 1302 may receive speaker identification information from uplink SID logic 216 that includes a measure of confidence that indicates the likelihood that the particular portion of speech signal 1308 is associated with a target near-end speaker. It is likely that the measure of confidence will be relatively higher for portions including speech from a desired source only or a combination of speech from the desired source and wind noise and will be relatively lower for portions including a non-desired source only, wind noise only, or a combination of a non-desired source and wind noise. Accordingly, wind noise detector 1302 may use the measure of confidence (in addition to or in lieu of other metrics) to more accurately determine whether or not a particular portion of speech signal 1308 comprises speech from a desired source only, a non-desired source only, wind noise only, or any combination thereof.

In addition to determining the content of speech signal 1308, wind noise detector 1302 may be configured to estimate the energy level of the wind noise during periods when speech signal 1308 comprises wind noise only and no other desired speech sources. For example, when the measure of confidence is relatively low, wind noise detector 1302 may determine that speech signal 1308 comprises wind noise only and estimate the energy level of the wind noise.

Wind noise suppressor 1304 may be configured to apply a particular level of attenuation based on the determination of wind noise detector 1302. For example, in response to wind noise detector 1302 determining that a portion of speech signal 1308 comprises wind noise only, wind noise suppressor 1304 may be configured to apply full-band attenuation. The full band-attenuation may be constant or may be a function of the energy level estimated by wind noise detector 1302.

In response to wind noise detector 1302 determining that a portion of speech signal 1308 comprises speech from a desired source only, the portion of speech signal 1308 is not attenuated.

In response to wind noise detector 1302 determining that a portion of speech signal 1308 comprises a combination of a non-desired source and wind noise, wind noise suppressor 1304 may be configured to apply a first level of attenuation to the portion of speech signal 1308. For example, in an embodiment, wind noise suppressor 1304 may apply a full-band attenuation of speech signal 1306. For instance, if the non-desired source includes non-intelligible speech, background noise, etc., full-band attenuation may be applied to remove all such non-desired sources, along with the wind-noise. In another embodiment, wind noise suppressor 1304 may attenuate certain frequency sub-bands of the lower spectrum of speech signal 1308 that are comprised primarily of wind noise. In accordance with such an embodiment, the non-desired source contained in the upper spectrum may be preserved. In either embodiment, the attenuation may be a function of at least the energy level estimated by wind noise detector 1302.

In response to wind noise detector 1302 determining that a portion of speech signal 1306 comprises a combination of a desired source and wind noise, wind noise suppressor 1304 may be configured to apply a second level of attenuation to the portion of speech signal 1308 that is less than the first level. For example, in an embodiment, wind noise suppressor 1304 may attenuate certain frequency sub-bands of the lower spectrum of speech signal 1308 that are comprised primarily of wind noise. The level of attenuation across the lower spectrum may be a function of the wind noise energy estimated by wind noise detector 1302. However, the level of attenuation applied is to a lesser degree than what is performed when a determination is made that a portion of speech signal 1308 comprises a combination of a non-desired source and wind noise.

In yet another embodiment, wind noise detector 1302 determines the amount of wind noise present in terms of its energy concentration and spectral characteristics, and wind noise suppressor 1304 is implemented as a time-varying filter, which is configured to operate as function of the estimated wind noise spectrum, as well as the probability that a desired speaker is talking. Wind noise suppressor 1304 may be implemented as a high pass filter since the energy of the wind noise is concentrated in the lower part of the spectrum, with the exact density and frequency slope being a function of the speed and direction of the wind. However, wind noise suppressor 1304 may be implemented to be other types filter, for example, a notch filter.

In accordance with such an embodiment, the measure of confidence included in the speaker identification information is used to control the various parameters of the filter that are applied, including, but not limited to, cutoff frequency, slope, pass-band attenuation and/or the like. Parameter estimator 1306 may be configured to determine the various parameters based on the measure of confidence. Although, other factors may also be used to properly determine the filter parameters.

These include wind noise characteristics provided by wind noise detector 1302, which may dictate, among other things, the stop band attenuation of the filter or its order. The objective of such an approach is to find the proper compromise between removing as much energy due to the wind noise, while preserving enough of the speech spectrum of the desired near-end talker. For example, the higher the measure of confidence, the more the compromise is biased towards preserving the speech spectrum, for example, by setting a lower cutoff frequency of the filter. When the measure of confidence is zero, the cutoff frequency and the stop band of the filter may be entirely controlled by the estimated shape of the wind noise spectrum and may be as high (in terms of frequency and level) as deemed necessary to yield a significant attenuation of the perceived level of wind noise to the listener.

There are numerous schemes that can be used to combine the output of wind noise detector 1302 and parameter estimator 1306 to yield the filter parameters. These can be in the form of a set of heuristic rules based on empirical experiments, or they can be in the form of a formal model that generates sets of filter parameters for various combinations of probabilities and spectral parameters of the wind noise. These are only examples and other schemes may be used, as persons skilled in the relevant arts would appreciate.

Figure 14:
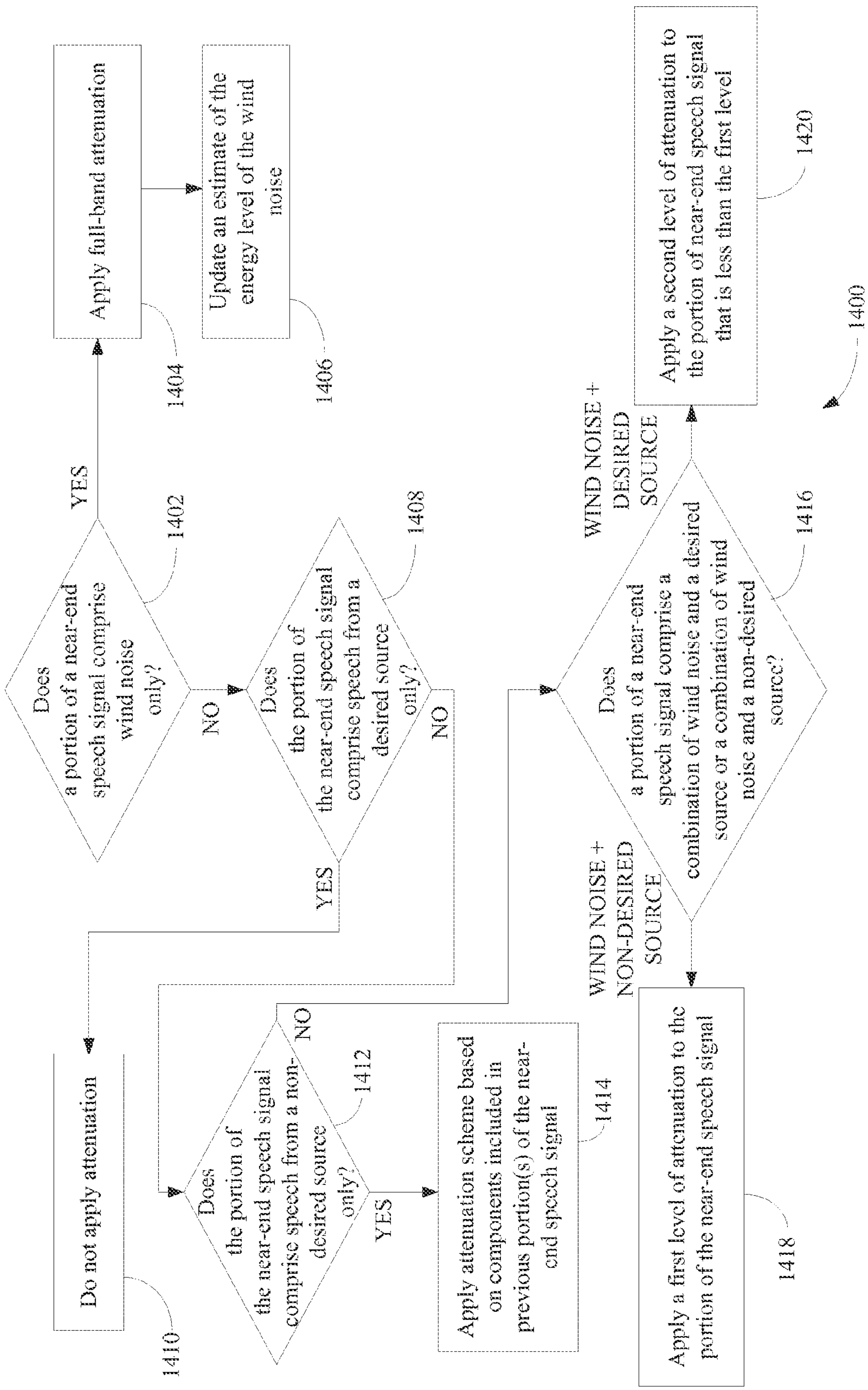
FIG. 14 is a flowchart of a method for performing single-channel wind noise reduction based at least in part on the identity of a near-end speaker in accordance with an embodiment.

FIG. 14 depicts a flowchart 1400 of an example method for performing single-channel wind noise reduction based on whether a portion of speech signal 1308 comprises a combination of a desired source and wind noise or a combination of a non-desired source and wind noise using speaker identification information. The method of flowchart 1400 will now be described with continued reference to FIG. 13, although the method is not limited to that implementation. Other structural and operational embodiments will be apparent to persons skilled in the relevant art(s) based on the discussion regarding flowchart 1400.

As shown in FIG. 14, the method of flowchart 1400 begins at step 1402. At step 1402, a determination is made as to whether a portion of a near-end speech signal comprises wind noise only (e.g., the near-end speech signal includes no speech sources) based at least in part on speaker identification information. For example, as shown in FIG. 13, wind noise detector 1302 determines whether a portion of speech signal 1308 comprises wind noise only based at least in part on speaker identification information. If it is determined that the portion comprises wind noise only, flow continues to step 1404. Otherwise, flow continues to step 1408.

At step 1404, full-band attenuation is applied to the portion of the near-end speech signal. For example, as shown in FIG. 13, wind noise suppressor 1304 applies full-band attenuation to the portion of speech signal 1308. The full band-attenuation may be constant or may be a function of the energy level estimated by wind noise detector 1302.

At step 1406, an estimate of the energy level of the wind noise is updated. For example, as shown in FIG. 13, wind noise detector 1302 updates the estimate of the energy level of the wind noise.

At step 1408, a determination is made as to whether the portion of the near-end speech signal comprises speech from a desired source only based at least in part on speaker identification information. For example, as shown in FIG. 13, wind noise detector 1302 determines whether a portion of speech signal 1308 comprises speech from a desired source only based at least in part on speaker identification information. If it is determined that the portion comprises speech from a desired source only, flow continues to step 1410. Otherwise, flow continues to step 1412.

At step 1410, no attenuation is applied, and the portion of the near-end speech signal is preserved.

At step 1412, a determination is made as to whether the portion of the near-end speech signal comprises a non-desired source only based at least in part on speaker identification information. For example, as shown in FIG. 13, wind noise detector 1302 determines whether a portion of speech signal 1308 comprises a non-desired source only based at least in part on speaker identification information. If it is determined that the portion comprises a non-desired source only, flow continues to step 1414. Otherwise, flow continues to step 1416.

At step 1414, an attenuation scheme is applied that is based on components (e.g., wind noise, a desired source, and/or a non-desired source) included in previous portion(s) of the near-end speech signal, with the objective of achieving a smooth transition between portion(s) of the near-end speech signal, as wind conditions may be very erratic. For example, if previous portion(s) of the near-end speech signal consisted of wind noise only, and a full-band attenuation was used for these portion(s), then the full-band attenuation is continued to be applied for the current portion of the near-end speech signal, but is ramped down over time. If previous portion(s) of the near-end speech signal consisted of a combination of a non-desired source and wind noise, and a first level of attenuation was used for these portion(s) (e.g., either a full-band attenuation or an attenuation of certain frequency sub-bands of the lower spectrum of the near-end speech signal that are comprised primarily of wind noise), then the first level of attenuation is continued to be applied for the current portion of the near-end speech signal, but is ramped down over time. In an embodiment where a high pass filter is used in either of these scenarios, the high pass filter is continued to be applied, but its cutoff frequency and/or its attenuation level is gradually reduced to ramp down the attenuation being applied. Lastly, if previous portion(s) of the near-end speech signal consisted of a desired source only (and thus no attenuation was applied for these portion(s)), then no attenuation is applied to the current portion of the near-end speech signal.

As shown in FIG. 13, wind noise suppressor 1304 applies an attenuation scheme to the portion of speech signal 1308 based on the components included in previous portion(s) of speech signal 1308.

At step 1416, a determination is made as to whether the portion of the near-end speech signal comprises a combination of wind noise and a desired source or a combination of wind noise and a non-desired source based at least in part on speaker identification information. For example, as shown in FIG. 13, wind noise detector 1302 determines whether a portion of speech signal 1308 comprises a combination of wind noise and a desired source or a combination of wind noise and a non-desired source based at least in part on speaker identification information. If it is determined that the portion comprises wind noise and a non-desired source, flow continues to step 1418. Otherwise, flow continues to step 1420.

At step 1418, a first level of attenuation is applied to the portion of the near-end speech signal. For example, as shown in FIG. 13, wind noise suppressor 1304 applies a first level of attenuation to the portion of speech signal 1308. In accordance with an embodiment, the first level of attenuation is applied to the lower spectrum of the near-end speech signal. The first level of attenuation may be a function of the estimated energy level of the wind noise.

At step 1420, a second level of attenuation is applied to the portion of the near-end speech signal that is less than the first level. For example, as shown in FIG. 13, wind noise suppressor 1304 applies a second level of attenuation to the portion of speech signal 1308 that is less than the first level. In accordance with an embodiment, the second level of attenuation is applied to the lower spectrum of the near-end speech signal. In accordance with another embodiment, the second level of attenuation is a full-band attenuation. In either embodiment, the attenuation may be a function of the estimated energy level of the wind noise.

Referring again to FIG. 2, in an embodiment, WNR stage 232 is configured to perform multi-microphone wind-noise reduction. In multi-microphone wind-noise reduction, if a primary microphone signal is corrupted by wind noise, the primary microphone signal waveform is replaced with a signal from another microphone after adjusting for the delay, signal intensity, spectral shape, and signal-to-noise ratio if that other microphone signal is not corrupted by wind noise. In a more advanced version, the replacement signal can be a combined version of multiple microphone signals that are not corrupted by wind noise. Furthermore, the signal replacement can be performed on a frequency bin basis, i.e., only corrupted frequency bins of the primary microphone signal are replaced by corresponding frequency bins of other microphone signals that are not corrupted by wind noise. A basic requirement in performing such operations is to be able to at least detect the presence of wind noise in all the microphone signals, or more generally, to be able to classify microphone signals as wind only, speech only, or a mixture of both. As will be described below, SID can be used to improve the performance of such a classification for each of the multiple microphone signals, and thus improve the overall performance of multi-microphone WNR.

Figure 15:
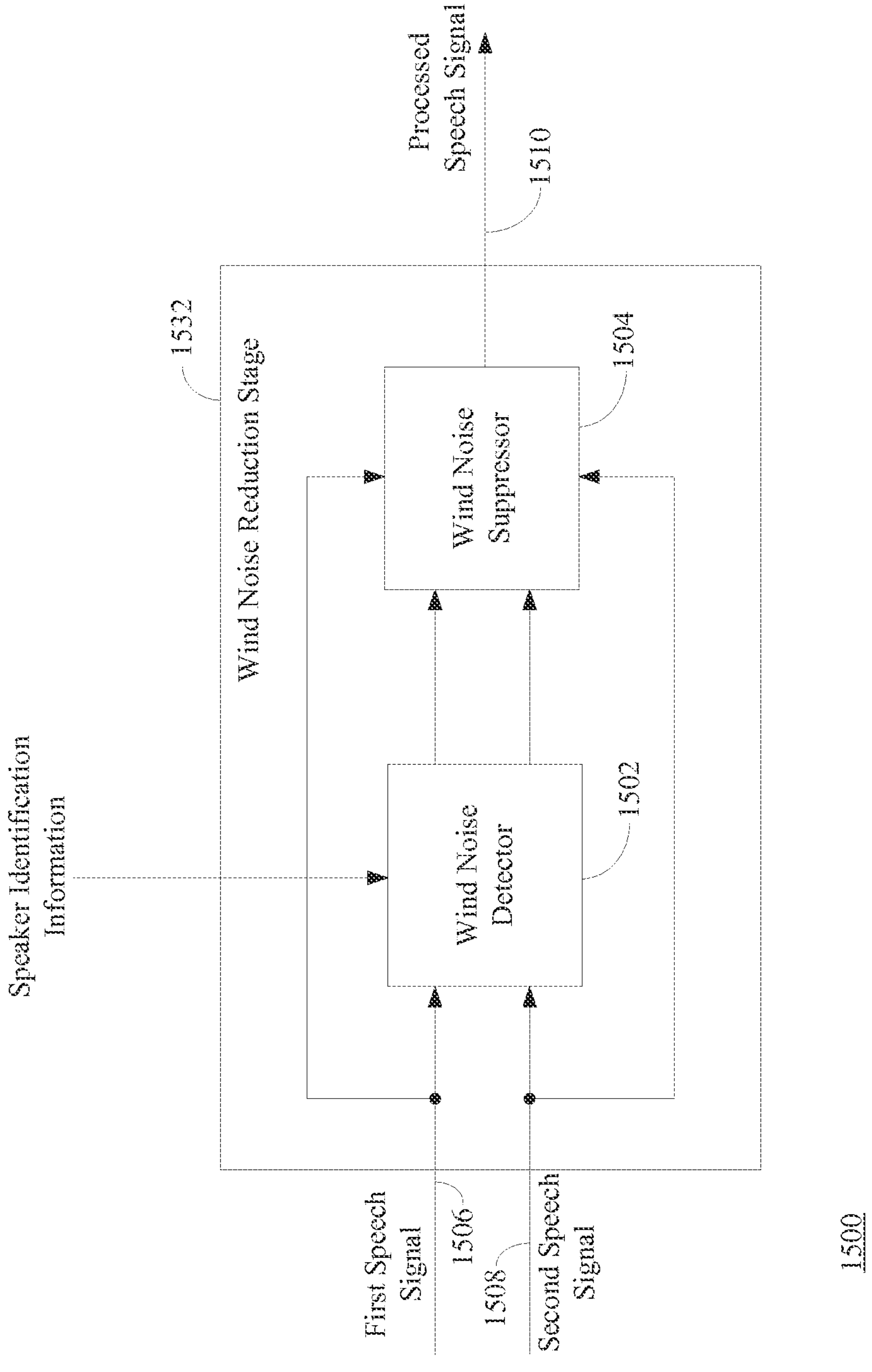
FIG. 15 is a block diagram of a multi-microphone wind noise reduction stage in accordance with an embodiment.

FIG. 15 is a block diagram 1500 of an example WNR stage 1532 in accordance with an embodiment. WNR stage 1532 comprises an example implementation of WNR stage 232 of uplink speech processing logic 206 as described above in reference to FIG. 2. In an embodiment, WNR stage 1532 is configured to perform multi-microphone wind noise reduction.

WNR stage 1532 receives first speech signal 1506 and second speech signal 1508. First speech signal 1506 and second speech signal 1508 may each be a respective version of a near-end speech signal (e.g., speech signal 220 as shown in FIG. 2) that was previously-processed by one or more uplink speech processing stages (e.g., AEC stage 222, MMNR stage 224, SCNS stage 226, RES stage 228 and/or SCD stage 230 as shown in FIG. 2). First speech signal 1506 may be received by a first microphone, and second speech signal 1508 may be received by a second microphone. It is noted that WNR stage 1532 may receive speech signals in addition to first speech signal 1506 and second speech signal 1508 in accordance with certain embodiments.

As shown in FIG. 15, WNR stage 1532 includes a wind noise detector 1502 and wind noise suppressor 1504. Wind noise detector 1502 may be configured to determine whether portion(s) of first speech signal 1506 and second speech signal 1508 comprise active speech or wind noise. Wind noise detector 1502 may receive speaker identification information from uplink SID logic 216 that includes a measure of confidence associated with each of first speech signal 1506 and second speech signal 1508 that indicates the likelihood that a particular portion of a respective speech signal (i.e., first speech signal 1506 or second speech signal 1508) is associated with a target near-end speaker. It is likely that the measure of confidence will be relatively higher for portions including active speech and will be relatively lower for portions wind noise. Accordingly, wind noise detector 1502 may use the respective measures of confidence to more accurately determine whether or not a particular portion of first speech signal 1506 and a particular portion of second speech signal 1508 comprises active speech or wind noise.

Wind noise suppressor 1504 may be configured to apply wind noise suppression to portion(s) of first speech signal 1506 based on the determinations of wind noise detector 1502 to provide a wind noise-suppressed speech signal (i.e., processed speech signal 1510), which may be provided to subsequent uplink speech processing stages for further processing and/or another communication device, such as a far-end audio communication system or device. For example, in response to wind noise detector 1502 determining that a portion of first speech signal 1506 comprises wind noise and that a portion of second speech signal 1508 comprises active speech, wind noise suppressor 1304 may be configured to obtain a replacement signal for the portion of first speech signal 1506 based on at least second speech signal 1508. In an embodiment, wind noise suppressor 1504 uses a portion of second speech signal 1508 that has been adjusted for delay, signal intensity, spectral shape, and/or signal-to-noise ratio as the replacement signal (i.e., wind noise suppressor 1504 replaces the portion of first speech signal 1506 with a portion of second speech signal 1508).

In accordance with an embodiment where WNR stage 1532 receives speech signals in addition to first speech signal 1506 and second speech signal 1508 (e.g., a third speech signal, a fourth speech signal, etc.), wind noise detector 1502 may be configured to determine whether portion(s) of first speech signal 1506 and the other speech signals received by WNR stage 1532 comprise active speech or wind noise. In accordance with such an embodiment, wind noise detector 1502 may receive speaker identification information from uplink SID logic 216 that includes a measure of confidence associated with each of first speech signal 1506 and the other speech signals that indicates the likelihood that a particular portion of a respective speech signal is associated with a target near-end speaker.

In response to wind noise detector 1502 determining that a portion of first speech signal 1506 comprises wind noise and that portion(s) of at least one of the one or more other speech signals do not comprise wind noise, wind noise suppressor 1504 may be configured to obtain a replacement signal for the portion of first speech signal 1506 based on at least one of the one or more other speech signals. In an embodiment, wind noise suppressor 1504 uses a portion of at least one of the one or more other speech signals that do not comprise wind noise that has been adjusted for delay, signal intensity, spectral shape, and/or signal-to-noise ratio as the replacement signal (i.e., wind noise suppressor 1504 replaces the portion of first speech signal 1506 based on a combination of the at least one of the one or more other speech signals that do not comprise wind noise).

In accordance with an embodiment, the signal replacement performed by wind noise suppressor 1504 is performed on a frequency bin basis. That is, only corrupted frequency bins (i.e., frequency bins containing wind noise) of first speech signal 1506 are replaced by corresponding frequency bins of at least one of the one or more other speech signals that are not corrupted by wind noise (i.e., frequency bins containing active speech).

In accordance with yet another embodiment, in the event that wind noise detector 1502 determines that portions(s) of all speech signals received by WNR stage 1532 comprise wind noise, wind noise suppressor 1503 performs a packet loss concealment (PLC) operation that extrapolates the previous portions of the speech signals to obtain the replacement signal, or uses some other suitable PLC technique to obtain the replacement signal. Performance of such PLC operations may also be improved using SID. Additional information regarding PLC operations using SID is described in commonly-owned, co-pending U.S. patent application Ser. No. 14/041,464, entitled "Speaker-Identification-Assisted Downlink Speech Processing Systems and Methods," the entirety of which is incorporated by reference herein.

Figure 16:
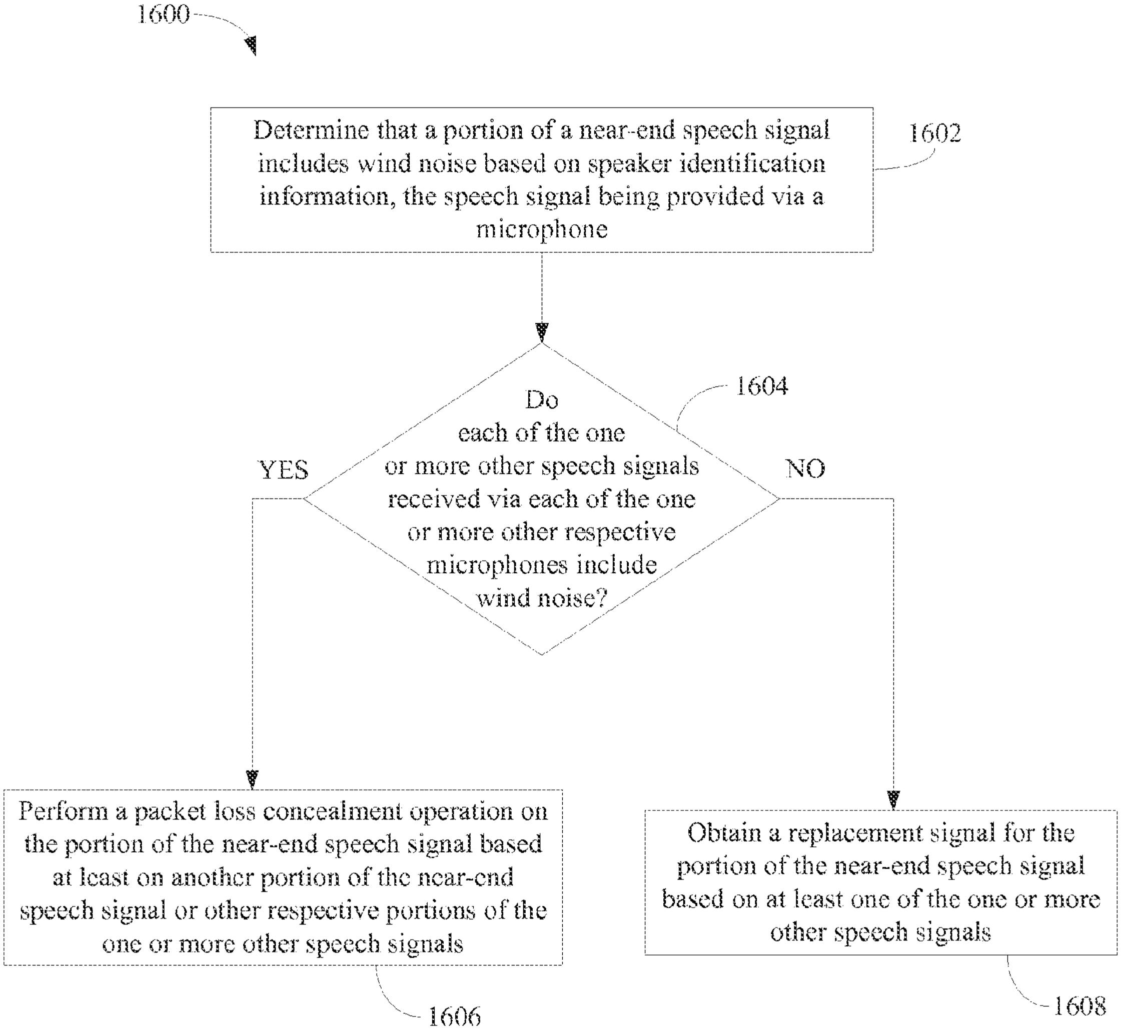
FIG. 16 is a flowchart of a method for performing multi-microphone wind noise reduction based at least in part on the identity of a near-end speaker in accordance with an embodiment.

FIG. 16 depicts a flowchart 1600 of an example method for performing multi-microphone wind noise reduction based on whether a portion of first speech signal 1506 comprises active speech or wind noise using speaker identification information. The method of flowchart 1600 will now be described with continued reference to FIG. 15, although the method is not limited to that implementation. Other structural and operational embodiments will be apparent to persons skilled in the relevant art(s) based on the discussion regarding flowchart 1600.

As shown in FIG. 16, the method of flowchart 1600 begins at step 1602. At step 1602, it is determined that a portion of a near-end speech signal includes wind noise based on speaker identification information. The speech signal is provided via a microphone. For example, as shown in FIG. 15, wind noise detector 1502 determines that a portion of first speech signal 1506 includes wind noise based on speaker identification information.

At step 1604, a determination is made as to whether each of the one or more other speech signals received via each of the one or more other respective microphones include wind noise based on the speaker identification information. For example, as shown in FIG. 15, wind noise detector 1502 determines whether second speech signal 1508 includes wind noise based on the speaker identification information. If it is determined that each of the one or more other speech signals includes wind noise, flow continues to step 1606. Otherwise, flow continues to step 1608.

At step 1606, a packet loss concealment operation is performed on the portion of the near-end speech signal based at least on another portion of the near-end speech signal or other respective portions of the one or more other speech signals. For example, as shown in FIG. 15, wind noise suppressor 1504 performs a packet loss concealment operation on the portion of first speech signal 1506 based at least on another portion of first speech signal 1506 and/or another portion of second speech signal 1508.

At step 1608, a replacement signal is obtained for the portion of the near-end speech signal based on at least one of the one or more other speech signals. For example, as shown in FIG. 15, wind noise suppressor 1504 obtains a replacement signal for the portion of first speech signal 1506 based on at least second speech signal 1508.

G. Automatic Speech Recognition (ASR) Stage

Most ASR algorithms, such as voice command recognition or unrestricted large-vocabulary speech recognition are so-called "speaker-independent" ASR systems, which rely on generic acoustic models that are based on the general population for word recognition. It is well-known in the art that when changing an ASR system from "speaker-independent" to "speaker-dependent" (e.g., optimizing the ASR algorithm by using the target speaker's voice), the ASR accuracy can be expected to improve, often very significantly. The reason speaker-dependent ASR is not widely used is mainly because it requires a lot of training by the target user and quite a bit of speech data to train properly. Therefore, users are generally reluctant to perform such a training process. However, as will be described below, by using SID, the training of ASR by the target user can be done in the background without the user's knowledge, and the generic acoustic model can be adapted to be speaker-specific during the process, thus removing an obstacle for implementing speaker-dependent ASR. When using SID, the speaker-dependent ASR system can keep training and enable the speaker-dependent ASR mode when the system deems it to be ready. Before the system can reach that state, the system can use speaker adaptation and normalization to improve the performance along the way.

Figure 17:
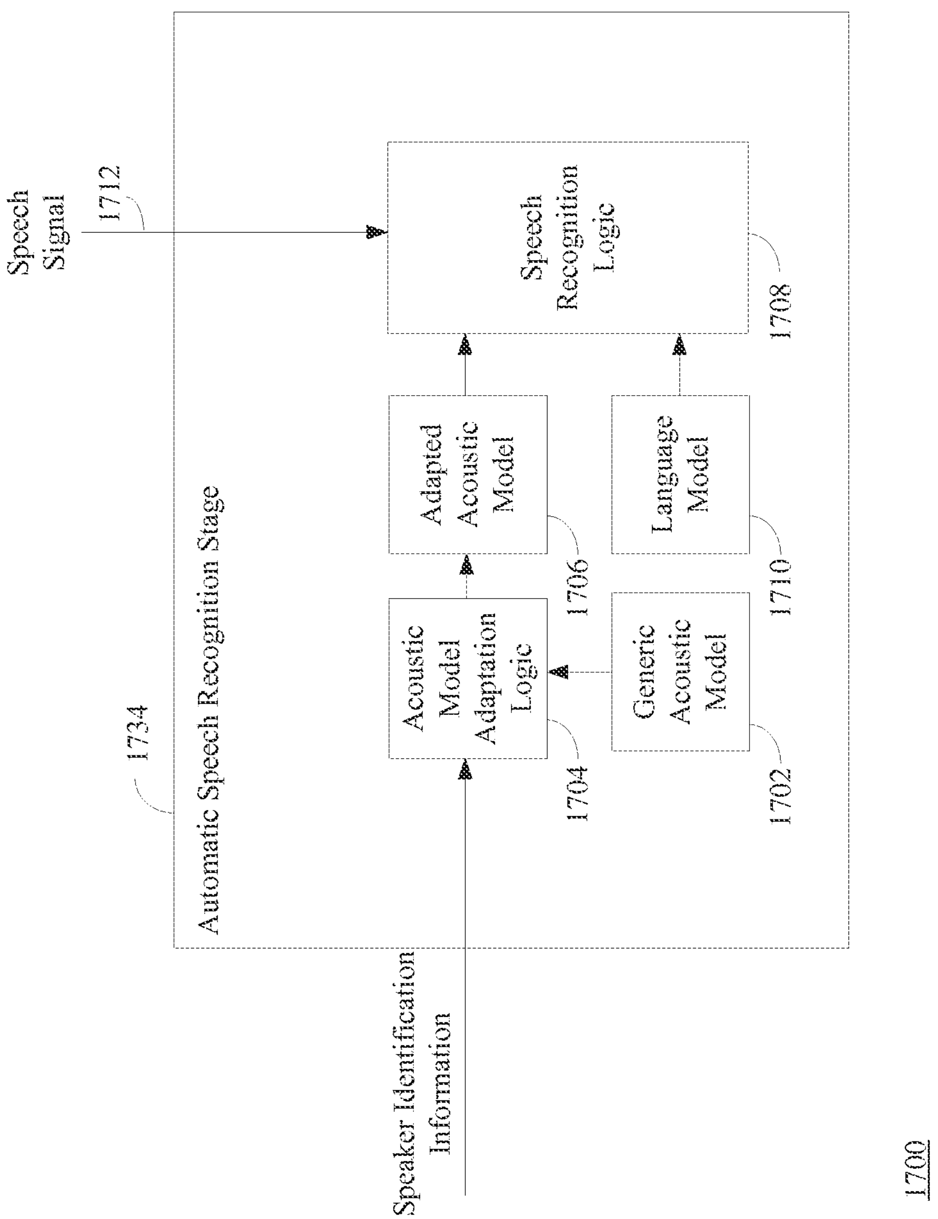
FIG. 17 is a block diagram of an automatic speech recognition stage in accordance with an embodiment.

FIG. 17 is a block diagram 1700 of an example ASR stage 1734 in accordance with an embodiment. ASR stage 1734 comprises an example implementation of ASR stage 234 of uplink speech processing logic 206 as described above in reference to FIG. 2. ASR stage 1734 is configured to perform speaker-dependent ASR.

ASR stage 1734 receives speech signal 1712, which may be a version of a near-end speech signal (e.g., speech signal 220 as shown in FIG. 2) that was previously-processed by one or more uplink speech processing stages (e.g., AEC stage 222, MMNR stage 224, SCNS stage 226, RES stage 228, SCD stage 230 and/or WNR stage 232 as shown in FIG. 2).

As shown in FIG. 17, ASR stage 1734 includes a generic acoustic model 1702, acoustic model adaptation logic 1704, an adapted acoustic model 1706, speech recognition logic 1708 and a language model 1710. Generic acoustic model 1702 is obtained by taking a large database of speech (referred to as a speech corpus) that is based on a general population of users and using training algorithms to create statistical representations for each unit of one or more languages. A unit may be represented by a phoneme, a word, multiple phonemes, word combinations, and/or the like, of the one or more languages. In an embodiment, these statistical representations may be modeled using Hidden Markov Models (HMMs), where each unit is associated with its own HMM. As will be appreciated by persons skilled in the relevant arts, each unit may be modeled using other types of models.

Acoustic model adaptation logic 1704 may be configured to adapt generic acoustic model 1702 into an adapted acoustic model 1706 for a target near-end speaker. In an embodiment, acoustic model adaptation logic 1704 uses the speaker model (e.g., speaker model 208) obtained for the target near-end speaker to adapt generic acoustic model 1702. In accordance with such an embodiment, acoustic model adaptation logic 1702 uses speaker-dependent features of the speaker model associated with the target near-end user (that were extracted from speech signal 220 by feature extraction logic 202 as shown in FIG. 2) to adapt generic acoustic model 1702 into adapted acoustic model 1706. Language model 1710 contains a large list of words and their probability of occurrence in a given sequence. Each word contained in language model 1710 has an associated list of units. In accordance with certain embodiments, language model 1710 may also be adapted for the target near-end speaker. For example, different speakers may use different phrases to accomplish the same task. Therefore, it is likely that different users will have different probabilities of occurrences for various words in language model 1710. ASR stage 1734 may include logic that adapts language model 1710 as the user speaks over time.

Acoustic model adaptation logic 1704 may obtain speaker model 208 in response to the enablement of an SID-assisted mode for ASR stage 1734. For example, acoustic model adaptation logic 1704 may receive speaker identification information that includes a measure of confidence that indicates the likelihood that the particular portion of speech signal 1712 is associated with a target near-end speaker. Upon the measure of confidence reaching a threshold, the SID-assisted mode of ASR stage 1734 is enabled, and acoustic model adaptation logic 1704 accesses the speaker model (e.g., speaker model 208 as shown in FIG. 2) that is associated with the target near-end speaker. In an embodiment, acoustic model adaptation logic 1704 accesses the target near-end speaker's speaker model via an identifier included in speaker identification information received by acoustic model adaptation logic 1704. In another embodiment, the speaker model associated with the target near-end speaker is directly provided to acoustic model adaptation logic 1704 via the speaker identification information.

Acoustic model adaptation logic 1704 may continue to adapt generic acoustic model 1702 as the measure of confidence increases so that adapted acoustic model 1706 becomes more and more tailored for the target near-end speaker.

Speech recognition logic 1708 is configured to recognize a word or phrase spoken by the target near-end speaker. For example, speech recognition logic 1708 may obtain portion(s) of speech signal 1712 and compare features of the obtained portions to features of adapted acoustic model 1706 to find the equivalent units. Thereafter, speech recognition logic 1708 searches language model 1710 for the equivalent series of units. Upon finding a match, speech recognition logic 1708 causes certain operation(s) to be performed on communication device 102 that are associated with the matched series of units.

A potential issue may arise if a target near-end speaker has a strong accent and some of the words or phrases are often incorrectly recognized. To remedy such a deficiency, speech recognition logic 1708 may monitor the target near-end speaker's response to the ASR-recognized voice command 1714. If the target near-end speaker continues to try to speak the same words or phrases after the operation associated with voice command 1714 is issued, speech recognition logic 1708 may determine that the recognized words or phrases are wrong. On the other hand, if the target near-end speaker moves forward to a next logical task, speech recognition logic 1708 may determine that that the recognized words or phrases are correct. Such a technique may also improve the overall recognition accuracy over time as that target near-end speaker continues to use the ASR system if ASR stage 1734 uses only such correctly recognized words and phrases to further adapt and improve adapted acoustic model 1706.

In accordance with an embodiment, SID-assisted ASR could also be used to select the target near-end user's preferred command set. For example, SID could be used in the communication device's wake-up feature where a user utters a "wake-up" command to transition the communication device from sleep mode or some other low power consumption mode to a more active state that is capable of more functionality. Without knowledge of the speaker ID, ASR stage 1734 would have to consider all "wake-up" commands previously used or configured. However, with knowledge of the speaker, only the speaker's customized list of commands (assuming the user has created one) can be considered in the speech recognition process, thereby improving performance. In accordance with such an embodiment, uplink SID logic 216 (as shown in FIG. 2) and ASR stage 1734 may cooperatively improve the performance of each other. For example, ASR stage 1734 may return a measure of confidence that is indicative of the likelihood that the target near-end speaker has spoken a certain word or command. The measure of confidence may also be tracked over time and/or over a number of words or commands. Uplink SID logic 216 may use this measure of confidence along with the command set to aid in the selection of the target near-end speaker. More generally, the frequency of words, phrases, phonemes, etc. that are used over time may assist in identifying the target near-end speaker.

In accordance with yet another embodiment, SID can also be used for rapid and low-complexity feature normalization. Feature normalization has been widely studied as a method by which to remove speaker-dependent components from input features, instead of passing "generic speaker" portions (e.g., frames) to the ASR system (e.g., ASR stage 1734). Such systems train the speaker-dependent feature mapping based on labeled training speech. There is an inherent tradeoff for such systems between the complexity of the feature mapping and the amount of required training data. Traditional methods such as maximum likelihood linear regression (MLLR) learn an affine matrix transformation for each GMM mixture in each HMM state in each separate phonetic model. Such methods are powerful, but require data sets on the order of tens of minutes to saturate. There exist low-complexity feature mappings such as vocal tract length normalization (VTLN), which learn a simple (often linear) frequency warping of spectral analysis within feature extraction. Such methods are less powerful, but require much less data.

SID can be used to design a powerful yet low-complexity feature normalization system. If a speech frame is identified as being associated with a certain target near-end user, the speaker model obtained by SID (e.g., speaker model 208 obtained by uplink SID logic 216) can be used to determine the appropriate feature mapping. The mapping applied to adapt the speaker-dependent GMM from the universal background model (UBM) during SID training (as described above with reference to FIG. 2) is simply reversed to remove speaker-dependent components of the input frame (assuming that uplink SID logic 216 and ASR stage 1734 use the same feature extraction). This normalization method provides phoneme-dependent feature mappings similar to algorithms like MLLR. However, the complexity is greatly reduced since this phoneme dependence is supplied by a GMM rather than a set of HMMs.

The SID-assisted ASR techniques described above may be particularly useful for voice command recognition performed locally by a communication device, as there is usually only one primary user of the communication device, there are only a handful of voice commands to train, and the training and updating of the acoustic models occur within the communication device.

For a cloud-based ASR engine, the usefulness is less clear because the actual recognition task is performed in the "cloud" by servers on the Internet, and the servers would have to perform speech recognition on millions of people, thereby making it impractical to keep individually trained ASR models for each of the millions of people on the servers. Also, performing SID among millions of people would be tedious.

In accordance with an embodiment, SID-assisted cloud-based ASR may be simplified by performing SID locally to the communication device among its very few possible users. Thereafter, the cloud-based ASR engine may receive the SID result from the communication device, along with an additional identifier (e.g., a phone number). The cloud-based ASR engine receives the SID result and the additional identifier and can simply identify the speaker as the "k-th speaker at this particular phone number" and update the ASR acoustic models for that speaker accordingly.

Given that different people can have vastly different accents and different ways of speaking the same thing, it is no wonder that the speaker-independent ASR systems (which basically use a one-size-fit-all approach) have a limit on how high the recognition accuracy can be. However, by using the approaches described above in this subsection to make ASR systems speaker-dependent, without the requirement to train it explicitly, the recognition accuracy for ASR system may significantly improve.

Figure 18:
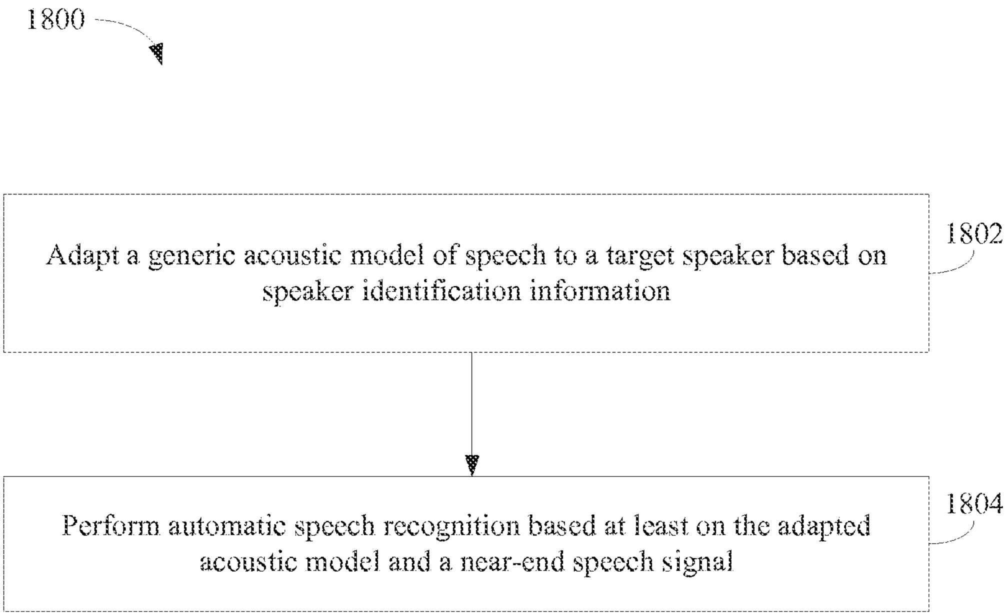
FIG. 18 is a flowchart of a method for performing automatic speech recognition based at least in part on the identity of a near-end speaker in accordance with an embodiment.

Accordingly, in embodiments, ASR stage 1734 may operate in various ways to perform automatic speech recognition based at least in part on the identity of the near-end speaker. FIG. 18 depicts a flowchart 1800 of an example method for performing automatic speech recognition based at least in part on the identity of the near-end speaker. The method of flowchart 1800 will now be described with continued reference to FIG. 17, although the method is not limited to that implementation. Other structural and operational embodiments will be apparent to persons skilled in the relevant art(s) based on the discussion regarding flowchart 1800.

As shown in FIG. 18, the method of flowchart 1800 begins at step 1802. At step 1802, a generic acoustic model of speech is adapted to a target speaker based on speaker identification information. For example, as shown in FIG. 17, acoustic model adaptation logic 1704 adapts generic acoustic model 1702 to obtain adapted acoustic model 1706, which is an acoustic model that is adapted to a target near-end speaker based on speaker identification information.

At step 1804, automatic speech recognition is performed based at least on the adapted acoustic model and a near-end speech signal. For example, as shown in FIG. 17, speech recognition logic 1708 performs automatic speech recognition based at least on adapted acoustic model 1706 and speech signal 1712.

H. Speech Encoding Stage

Speech encoding stage 236 may be configured to perform speech encoding operations based at least in part on the identity of a near-end user during a communication session. For example, uplink SID logic 216 may provide speaker identification information that identifies the target near-end speaker to speech encoding stage 236, and speech encoding stage 236 may encode a speech signal in a manner that uses such speaker identification information. The speech signal may be a version of a near-end speech signal (e.g., speech signal 220 as shown in FIG. 2) that was previously-processed by one or more uplink speech processing stages (e.g., AEC stage 222, MMNR stage 224, SCNS stage 226, RES stage 228, SCD stage 230 and/or WNR stage 232).

In an embodiment, the received speech signal is encoded in a manner that uses speaker identification by modifying a configuration of a speech encoder. Modifying a configuration of the speech encoder may comprise, for example, replacing a speaker-independent quantization table or codebook with a speaker-dependent quantization table or codebook or replacing a first speaker-dependent quantization table or codebook with a second speaker-dependent quantization table or codebook. In another embodiment, a configuration of a speech encoder may be modified by replacing a speaker-independent encoding algorithm with a speaker-dependent encoding algorithm or replacing a first speaker-dependent encoding algorithm with a second speaker-dependent encoding algorithm. It is noted that the modification(s) described above may require corresponding modification(s) to a speech decoder (e.g., included in downlink speech processing logic 112 as shown in FIG. 1 and/or included in a far-end communication device) in order for the decoding operations to be performed properly. Further details concerning how a speech signal may be encoded in a speaker-dependent manner may be found in commonly-owned, co-pending U.S. patent application Ser. No. 12/887,329, entitled "User Attribute Derivation and Update for Network/Peer Assisted Speech Coding" and filed on Sep. 21, 2010, the entirety of which is incorporated by reference as if fully set forth herein.

IV. Other Embodiments

The various uplink speech processing algorithm(s) described above may also use a weighted combination of speech models and/or parameters that are optimized based on a plurality of measures of confidences associated with one or more target near-end speakers. Further details concerning such an embodiment may be found in commonly-owned, co-pending U.S. patent application Ser. No. 13/965,661, entitled "Speaker-Identification-Assisted Speech Processing Systems and Methods" and filed on Aug. 13, 2013, the entirety of which is incorporated by reference as if fully set forth herein Additionally, it is noted that certain uplink speech processing algorithms described herein (e.g., single-channel noise suppression) may be applied during downlink speech processing (e.g., in downlink speech processing logic 112 as shown in FIG. 1).

V. Example Computer System Implementation

Figure 19:
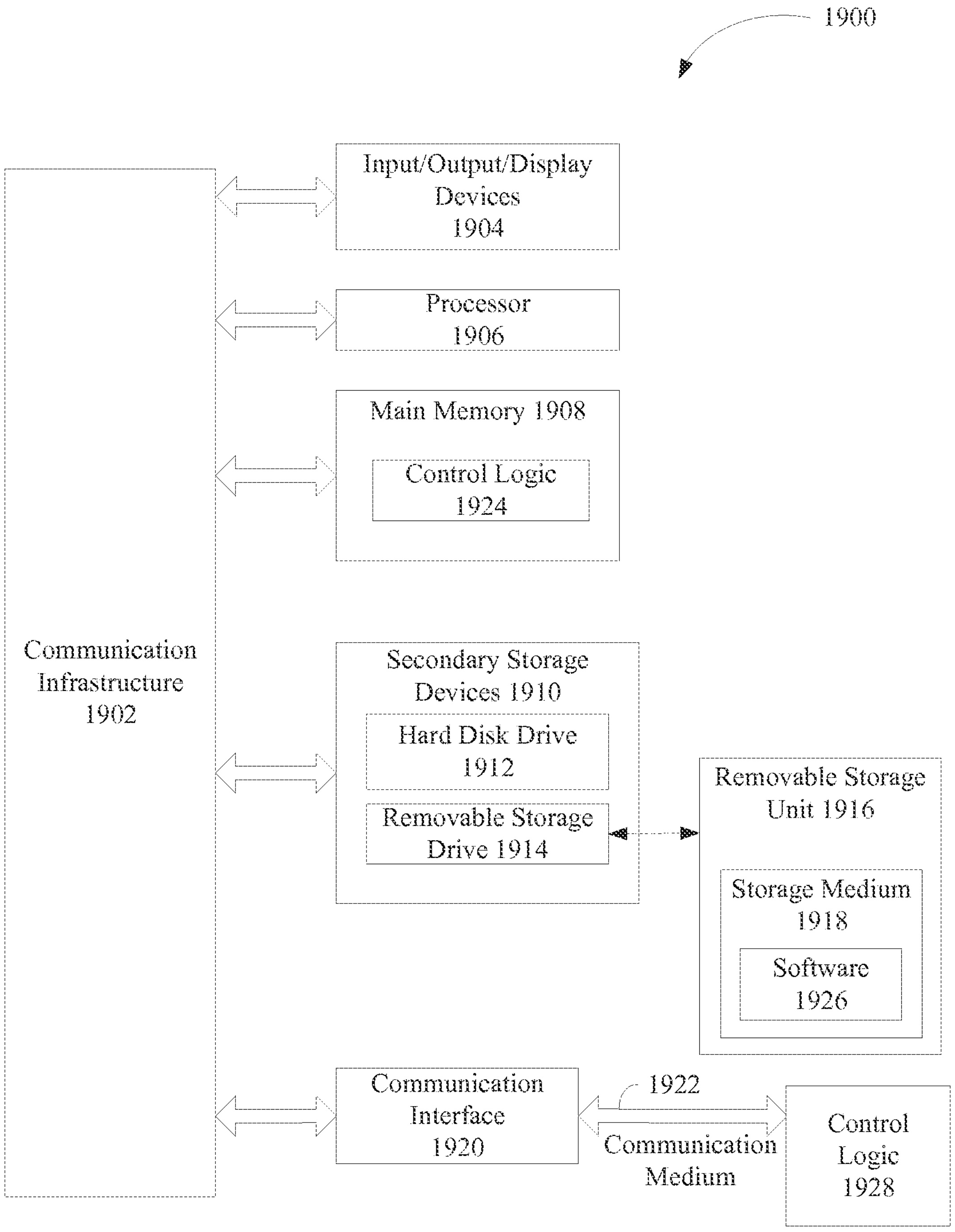
FIG. 19 is a block diagram of a computer system that may be used to implement embodiments described herein.

The embodiments described herein, including systems, methods/processes, and/or apparatuses, may be implemented using well known computers, such as computer 1900 shown in FIG. 19. For example, elements of communication device 102, including uplink speech processing logic 106, downlink speaker processing logic 112, uplink SID logic 116, downlink SID logic 118, and elements thereof; elements of uplink SID logic 216, uplink speech processing logic 206, elements of AEC stage 322, elements of MMNR stage 524, elements of SCNS stage 726, elements of RES stage 928, elements of SCD stage 1130, elements of WNR stage 1332, elements of WNR stage 1532, and elements of ASR stage 1734; each of the steps of flowchart 400 depicted in FIG. 4; each of the steps of flowchart 600 depicted in FIG. 6, each of the steps of flowchart 800 depicted in FIG. 8, each of the steps of flowchart 1000 depicted in FIG. 10, each of the steps of flowchart 1200 depicted in FIG. 12, each of the steps of flowchart 1400 depicted in FIG. 14, each of the steps of flowchart 1600 depicted in FIG. 16, each of the steps of flowchart 1800 depicted in FIG. 18, and each of the steps of flowchart 2000 depicted in FIG. 20 can be implemented using one or more computers 1900.

Computer 1900 can be any commercially available and well known computer capable of performing the functions described herein, such as computers available from International Business Machines, Apple, HP, Dell, Cray, etc. Computer 1900 may be any type of computer, including a desktop computer, a laptop computer, or a mobile device, including a cell phone, a tablet, a personal data assistant (PDA), a handheld computer, and/or the like.

As shown in FIG. 19, computer 1900 includes one or more processors (e.g., central processing units (CPUs) or digital signal processors (DSPs)), such as processor 1906. Processor 1906 may include elements of communication device 102, including uplink speech processing logic 106, downlink speaker processing logic 112, uplink SID logic 116, downlink SID logic 118, and elements thereof; elements of uplink SID logic 216, uplink speech processing logic 206, elements of AEC stage 322, elements of MMNR stage 524, elements of SCNS stage 726, elements of RES stage 928, elements of SCD stage 1130, elements of WNR stage 1332, elements of WNR stage 1532, and elements of ASR stage 1734; or any portion or combination thereof, for example, though the scope of the example embodiments is not limited in this respect. Processor 1906 is connected to a communication infrastructure 1902, which may include, for example, a communication bus. In some embodiments, processor 1906 can simultaneously operate multiple computing threads.

Computer 1900 also includes a primary or main memory 1908, such as a random access memory (RAM). Main memory has stored therein control logic 1924 (computer software), and data.

Computer 1900 also includes one or more secondary storage devices 1910. Secondary storage devices 1910 may include, for example, a hard disk drive 1912 and/or a removable storage device or drive 1914, as well as other types of storage devices, such as memory cards and memory sticks. For instance, computer 1900 may include an industry standard interface, such as a universal serial bus (USB) interface for interfacing with devices such as a memory stick. Removable storage drive 1914 represents a floppy disk drive, a magnetic tape drive, a compact disk drive, an optical storage device, tape backup, etc.

Removable storage drive 1914 interacts with a removable storage unit 1916. Removable storage unit 1916 includes a computer usable or readable storage medium 1918 having stored therein computer software 1926 (control logic) and/or data. Removable storage unit 1916 represents a floppy disk, magnetic tape, compact disc (CD), digital versatile disc (DVD), Blu-ray disc, optical storage disk, memory stick, memory card, or any other computer data storage device. Removable storage drive 1914 reads from and/or writes to removable storage unit 1916 in a well-known manner.

Computer 1900 also includes input/output/display devices 1904, such as monitors, keyboards, pointing devices, etc.

Computer 1900 further includes a communication or network interface 1920. Communication interface 1920 enables computer 1900 to communicate with remote devices. For example, communication interface 1920 allows computer 1900 to communicate over communication networks or mediums 1922 (representing a form of a computer usable or readable medium), such as local area networks (LANs), wide area networks (WANs), the Internet, etc. Network interface 1920 may interface with remote sites or networks via wired or wireless connections. Examples of communication interface 1922 include but are not limited to a modem (e.g., for 3G and/or 4 G communication(s)), a network interface card (e.g., an Ethernet card for Wi-Fi and/or other protocols), a communication port, a Personal Computer Memory Card International Association (PCMCIA) card, a wired or wireless USB port, etc.

Control logic 1928 may be transmitted to and from computer 1900 via the communication medium 1922.

Any apparatus or manufacture comprising a computer useable or readable medium having control logic (software) stored therein is referred to herein as a computer program product or program storage device. This includes, but is not limited to, computer 1900, main memory 1908, secondary storage devices 1910, and removable storage unit 1916. Such computer program products, having control logic stored therein that, when executed by one or more data processing devices, cause such data processing devices to operate as described herein, represent embodiments.

The disclosed technologies may be embodied in software, hardware, and/or firmware implementations other than those described herein. Any software, hardware, and firmware implementations suitable for performing the functions described herein can be used.

VI. Conclusion

Figure 20:
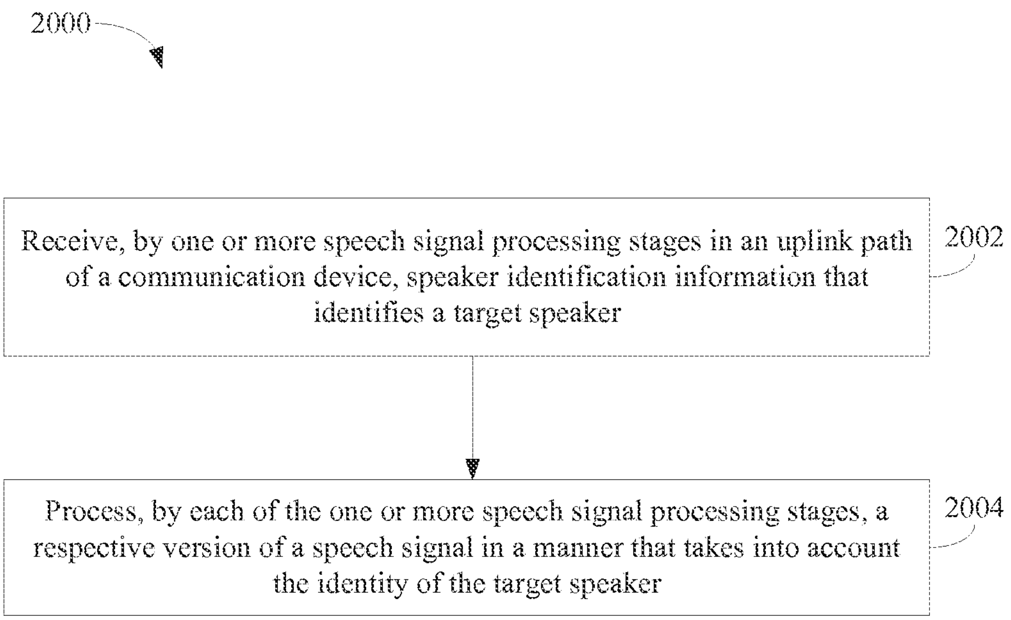
FIG. 20 is a flowchart of a method for processing a speech signal based on an identity of near-end speaker(s) in an uplink path of a communication device in accordance with an embodiment.

In summary, uplink speech processing logic 206 may operate in various ways to process a speech signal in a manner that takes into account the identity of identified target near-end speaker(s). FIG. 20 depicts a flowchart 2000 of an example method for processing a speech signal based on an identity of near-end speaker(s). The method of flowchart 2000 will now be described with reference to FIG. 2, although the method is not limited to that implementation. Other structural and operational embodiments will be apparent to persons skilled in the relevant art(s) based on the discussion regarding flowchart 2000.

As shown in FIG. 20, the method of flowchart 2000 begins at step 2002, in which speaker identification information that identifies a target speaker is received by one or more of a plurality of speech signal processing stages in an uplink path of a communication device. For example, with reference to FIG. 2, at least one of AEC stage 222, MMNR 224, SCNS stage 226, RES stage 228, SCD stage 230, WNR stage 232, ASR stage 234 and/or speech encoding stage 236 of uplink speech processing logic 206 receives speaker identification information from uplink SID logic 216.

At step 2004, a respective version of a speech signal is processed by each of the one or more speech signal processing stages in a manner that takes into account the identity of the target speaker. For example, with reference to FIG. 2, speech signal 220 (or a version thereof) is processed in a manner that takes into account the identity of the target near-end speaker by at least one AEC stage 222, MMNR 224, SCNS stage 226, RES stage 228, SCD stage 230, WNR stage 232, ASR stage 234 and/or speech encoding stage 236 of uplink speech processing logic 206.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:

receiving, by one or more speech signal processing stages in an uplink path of a communication device, speaker identification information that identifies a target speaker; and processing, by each of the one of the one or more speech signal processing stages, a respective version of a speech signal in a manner that takes into account the identity of the target speaker, wherein the one or more speech signal processing stages are at least partially implemented by one or more processors, and wherein the one or more speech signal processing stages include at least a sequential combination of three or more of:

an acoustic echo cancellation stage, a multi-microphone noise reduction stage, a residual echo suppression stage, a single channel dereverberation stage, a wind noise reduction stage, and an automatic speech recognition stage.

2. The method of claim 1, wherein processing a respective version of the speech signal by the acoustic echo cancellation stage comprises:

determining that a portion of the respective version of the speech signal does not comprise speech spoken by the target speaker based on the speaker identification information;

determining that a portion of a far-end speech signal comprises speech based on second speaker identification information that identifies a second target speaker; and updating at least one of one or more parameters of at least one acoustic echo cancellation filter used by the acoustic echo cancellation stage and statistics used to derive the one or more parameters in response to determining that the portion of the respective version of the speech signal does not comprise speech spoken by the target speaker and the portion of the far-end speech signal comprises speech.

3. The method of claim 1, wherein processing a respective version of the speech signal by the multi-microphone noise reduction stage comprises:

determining a noise component of a reference signal received from a reference microphone by removing one or more speech components associated with the target speaker from the reference signal based on the speaker identification information; and removing an estimated noise component from a portion of the respective version of the speech signal that is based on the determined noise component of the reference signal.

4. The method of claim 1, wherein processing a respective version of the speech signal by the residual echo suppression stage comprises:

determining that a portion of the respective version of the speech signal does not comprise speech spoken by the target speaker based on the speaker identification information;

determining that a portion of a far-end speech signal comprises speech based on second speaker identification information that identifies a second target speaker; and increasing a degree of residual echo suppression applied to the portion of the respective version of the speech signal in response to determining that the portion of the respective version of the speech signal does not comprise speech spoken by the target speaker and the portion of the far-end speech signal comprises speech.

5. The method of claim 1, wherein processing a respective version of the speech signal by the single-channel noise suppression stage comprises:

determining whether a portion of the respective version of the speech signal comprises noise only based at least in part on the speaker identification information; and in response to at least determining that the portion of the respective version of the speech signal comprises noise only:

updating statistics of noise components of the respective version of the speech signal; and performing noise suppression on the portion of the respective version of the speech signal based at least on the updated statistics.

6. The method of claim 1, wherein processing a respective version of the speech signal by the wind noise reduction stage comprises:

determining whether a portion of the respective version of the speech signal comprises a combination of wind noise and a desired source or a combination of wind noise and a non-desired source based on the speaker identification information;

applying a first level of attenuation to the portion of the respective version of the speech signal in response to determining that the portion of the respective version of the speech signal comprises a combination of wind noise and the desired source; and applying a second level of attenuation to the portion of the respective version of the speech signal that is greater than the first level in response to determining that the portion of the respective version of the speech signal comprises a combination of wind noise and the non-desired source.

7. The method of claim 1, wherein processing a respective version of the speech signal by the wind noise reduction stage comprises:

determining that a portion of the respective version of the speech signal includes wind noise based on the speaker identification information, the speech signal being provided via a microphone;

determining whether one or more other speech signals received via one or more other respective microphones include wind noise based on the speaker identification information; and in response to determining that at least one of the one or more other speech signals does not include wind noise, obtaining a replacement signal for the portion of the respective version of the speech signal based on at least one of the one or more other speech signals.

8. The method of claim 1, wherein processing a respective version of the speech signal by the single channel dereverberation stage comprises:

obtaining an estimate of reverberation included in a portion of the respective version of the speech signal based at least in part on the speaker identification information; and suppressing the reverberation based on the obtained estimate.

9. The method of claim 1, wherein processing a respective version of the speech signal by the automatic speech recognition stage comprises:

adapting a generic acoustic model of speech to the target speaker based on the speaker identification information; and performing automatic speech recognition based at least on the adapted acoustic model and the respective version of the speech signal.

10. A communication device, comprising:

uplink speech processing logic comprising one or more speech signal processing stages, each of the one or more speech signal processing stages being configured to receive speaker identification information that identifies a target speaker and process a respective version of the speech signal in a manner that takes into account the identity of the target speaker, the one or more speech signal processing stages being at least partially implemented by one or more processors, and the one or more speech signal processing stages including at least a sequential combination of three or more of: an acoustic echo cancellation stage, a multi-microphone noise reduction stage, a residual echo suppression stage, a single channel dereverberation stage, a wind noise reduction stage, and an automatic speech recognition stage.

11. The communication device of claim 10, wherein the acoustic echo cancellation stage is configured to:

determine that a portion of the respective version of the speech signal does not comprise speech based on the speaker identification information;

determine that a portion of a far-end speech signal comprises speech spoken by the target speaker based on second speaker identification information that identifies a second target speaker; and update at least one of one or more parameters of at least one acoustic echo cancellation filter used by the acoustic echo cancellation stage and statistics used to derive the one or more parameters in response to a determination that the portion of the respective version of the speech signal does not comprise speech spoken by the target speaker and the portion of the far-end speech signal comprises speech.

12. The communication device of claim 10, wherein the multi-microphone noise reduction stage is configured to:

determine a noise component of a reference signal received from a reference microphone by removing one or more speech components associated with the target speaker from the reference signal; and remove an estimated noise component from a portion of the respective version of the speech signal that is based on the determined noise component of the reference signal based on the speaker identification information.

13. The communication device of claim 10, wherein the residual echo suppression stage is configured to:

determine that a portion of the respective version of the speech signal does not comprise speech spoken by the target speaker based on the speaker identification information;

determine that a portion of a far-end speech signal comprises speech based on second speaker identification information that identifies a second target speaker; and increase a degree of residual echo suppression applied to the portion of the respective version of the speech signal in response to a determination that the portion of the respective version of the speech signal does not comprise speech spoken by the target speaker and the portion of the far-end speech signal comprises speech.

14. The communication device of claim 10, wherein the single-channel noise suppression stage is configured to:

determine whether a portion of the respective version of the speech signal comprises noise only based at least in part on the speaker identification information; and in response to at least a determination that the portion of the respective version of the speech signal comprises noise only:

update statistics of noise components of the respective version of the speech signal; and perform noise suppression on the portion of the respective version of the speech signal based at least on the updated statistics.

15. The communication device of claim 10, wherein of the wind noise reduction stage is configured to:

determine whether a portion of the respective version of the speech signal comprises wind noise, a non-desired source, or a desired source based on the speaker identification information; and attenuate the portion of the respective version of the speech signal in response to a determination that the portion of the respective version of the speech signal comprises wind noise or the non-desired source.

16. The communication device of claim 10, wherein the wind noise reduction stage is configured to:

determine whether a portion of the respective version of the speech signal comprises wind noise only based at least in part on the speaker identification information; and in response to at least a determination that the portion of the respective version of the speech signal comprises wind noise only:

update an estimate of the energy level of the wind noise; and perform wind noise reduction on the portion of the respective version of the speech signal based at least on the updated estimate.

17. The communication device of claim 10, wherein the single channel dereverberation stage is configured to:

obtain an estimate of reverberation included in a portion of the respective version of the speech signal based at least in part on the speaker identification information; and suppress the reverberation based on the obtained estimate.

18. The communication device of claim 10, wherein automatic speech recognition stage is configured to:

adapt a generic acoustic model of speech to the target speaker based on the speaker identification information; and perform automatic speech recognition based on the adapted acoustic model and the respective version of the speech signal.

19. A non-transitory computer readable storage medium having computer program instructions embodied in said non-transitory computer readable storage medium for enabling one or more processors to process a speech signal, the computer program instructions including instructions executable to perform operations comprising:

receiving, by one or more speech signal processing stages in an uplink path of a communication device, speaker identification information that identifies a target speaker; and processing, by each of the one of the one or more speech signal processing stages, a respective version of a speech signal in a manner that takes into account the identity of the target speaker, wherein the one or more speech signal processing stages include at least a sequential combination of three or more of: an acoustic echo cancellation stage, a multi-microphone noise reduction stage, a residual echo suppression stage, a a single channel dereverberation stage, a wind noise reduction stage, and an automatic speech recognition stage.

20. The non-transitory computer readable storage medium of claim 19, wherein the one or more speech signal processing stages further includes:

a speech encoding stage.

* * * * *

UNITED STATES PATENT AND TRADEMARK OFFICE

CERTIFICATE OF CORRECTION

PATENT NO. : 9,269,368 B2
APPLICATION NO. : 14/069124
DATED : February 23, 2016
INVENTOR(S) : Juin-Hwey Chen et al.

It is certified that error appears in the above-identified patent and that said Letters Patent is hereby corrected as shown below:

In The Claims

Column 42, line 47, that portion reading "stage a a single channel" should read -- stage a single channel --.

Signed and Sealed this
Fourteenth Day of June, 2016

Michelle K. Lee

Michelle K. Lee
*Director of the United States Patent and Trademark Office*